United States Patent [19]
Childress et al.

[11] Patent Number: 5,117,501
[45] Date of Patent: May 26, 1992

[54] DYNAMIC REGROUPING IN A TRUNKED RADIO COMMUNICATIONS SYSTEM

[75] Inventors: Jeffrey S. Childress; David L. Hattey, both of Lynchburg, Va.

[73] Assignee: General Electric Company, Lynchburg, Va.

[21] Appl. No.: 229,814

[22] Filed: Aug. 8, 1988

[51] Int. Cl.$^5$ .............................................. H04B 7/15
[52] U.S. Cl. ................................. 455/11.1; 455/17; 455/34.1; 455/56.1; 379/63
[58] Field of Search ....................... 455/33-34, 455/11-12, 17, 56, 51, 54; 379/57-59, 63, 60; 340/825.01, 825.05, 825.52, 825.44; 370/95.1, 110.1; 375/114, 107, 108

[56] References Cited

U.S. PATENT DOCUMENTS

| | | | |
|---|---|---|---|
| 3,292,178 | 12/1966 | Magnuski | 455/38 |
| 3,458,664 | 7/1969 | Adlhoch et al. | 379/63 |
| 3,571,519 | 3/1971 | Tsimbidis | 379/63 |
| 3,696,210 | 10/1972 | Peterson et al. | 370/13 |
| 3,801,956 | 4/1974 | Braun et al. | 364/715.11 |
| 3,898,390 | 8/1975 | Wells et al. | 379/59 |
| 3,906,166 | 9/1975 | Cooper et al. | 379/60 |
| 3,936,616 | 2/1976 | DiGianfilippo | 379/63 |
| 3,970,801 | 7/1976 | Ross et al. | 379/63 |

(List continued on next page.)

FOREIGN PATENT DOCUMENTS 61-102836(A) 1/1986 Japan .
WO8701537 5/1987 PCT Int'l Appl. .

OTHER PUBLICATIONS

Federal Information Processing Standards, Pub. No. 46, Data Encryption Standard, US Dept of Comm, NTIS, (5285 Port Royal Rd., Springfield, Va 22161 "Voice and Data Transmission", Arrendondo, Teggeler and Smith, Bell Systems Technology Journal, vol. 58, No. 1, Jan. 1978, pp. 97-122.
"AmeriCom's Network Switch", product brochure, Jan. 26, 1988, AmeriCom Corporation, Atlanta, Georgia 30340.
"AmeriCom's Network Supervisor", product brochures, Jan. 26, 1988, AmeriCom Corporation, Atlanta, Georgia 30340.
"Motorola Announces the Syntor X 9000E Mobile Radio for SMARTNET Systems;" Motorola, Inc., Shaumburg, Il 60196; press release of Aug. 6, 1987; and Motorola Introduces SMARTNET MOSTAR Mobile Radio for Trunked and Conventional 800 MHz Systems, press release of Jun. 27, 1986.
Press Release dated Jun. 14, 1988 by Motorola, Inc. entitled "406-420 MHz 'Secure' SMARTNET Systems Trunked Communications for Federal Government Users".

*Primary Examiner*—Reinhard J. Eisenzopf
*Assistant Examiner*—Andrew Faile
*Attorney, Agent, or Firm*—Nixon & Vanderhye

[57] ABSTRACT

In a trunked radio frequency communications system, a dynamic regrouping scheme includes an effective user interface, automatic support of multi-site systems, the capability to program individual radio transceivers with multiple new groups dynamically, a fast rate of reconfiguration, instantaneous switch over to prevent radios from residing in immature groups, and a satisfactory mode of operation should the site controller (or site controllers in non-fault tolerant systems) fail. Some of the dynamic regrouping features includes unlimited prestored plans and source and destination groups per plan, regrouping at the plan or destination group level, an advanced user interface, automatic support of multiple sites, fast regrouping at the rate of over 30 radios per second while reducing loading on the system control channel, and fast activation/deactivation. Each plan can be immediately activated or deactivated and users are effectively regrouped together. An alternate control channel is used to regroup transceivers to avoid undue main control channel loading and to increase rate of regrouping.

30 Claims, 12 Drawing Sheets

U.S. PATENT DOCUMENTS

| | | | |
|---|---|---|---|
| 4,001,693 | 1/1977 | Stackhouse et al. | 455/51 |
| 4,010,327 | 3/1977 | Kobrinetz et al. | 379/58 |
| 4,012,597 | 3/1977 | Lynk, Jr. et al. | 455/53 |
| 4,022,973 | 5/1977 | Stackhouse | 375/114 |
| 4,027,243 | 5/1977 | Stackhouse | 375/114 |
| 4,029,901 | 6/1977 | Campbell | 379/58 |
| 4,128,740 | 12/1978 | Graziano | 455/33 |
| 4,131,849 | 12/1978 | Freeburg et al. | 375/5 |
| 4,152,647 | 5/1979 | Gladden et al. | 455/11 |
| 4,184,118 | 1/1980 | Cannalte et al. | 370/77 |
| 4,231,114 | 10/1980 | Dolikian | 455/49 |
| 4,267,593 | 5/1981 | Craiglow | 370/62 |
| 4,309,772 | 1/1982 | Kloker et al. | 375/76 |
| 4,312,070 | 1/1982 | Coombes et al. | 371/39.1 |
| 4,312,074 | 1/1982 | Pautler et al. | 375/96 |
| 4,322,576 | 3/1982 | Miller | 380/29 |
| 4,326,264 | 4/1982 | Cohen et al. | 364/900 |
| 4,339,823 | 7/1982 | Predina et al. | 375/20 |
| 4,347,625 | 8/1982 | Williams | 455/17 |
| 4,360,927 | 11/1982 | Bowen et al. | 455/17 |
| 4,369,443 | 1/1983 | Giallanza et al. | 340/825.47 |
| 4,382,298 | 5/1983 | Evans | 371/6 |
| 4,392,242 | 7/1983 | Kai | 455/33 |
| 4,400,585 | 8/1983 | Kamen et al. | 379/63 |
| 4,409,687 | 10/1983 | Berti et al. | 455/7 |
| 4,418,425 | 11/1983 | Fennel, Jr. et al. | 380/33 |
| 4,427,980 | 1/1984 | Fennel et al. | 340/825.52 |
| 4,430,742 | 2/1984 | Milleker et al. | 375/5 |
| 4,430,755 | 2/1984 | Nadir et al. | 455/77 |
| 4,433,256 | 2/1984 | Dolikian | 307/358 |
| 4,434,323 | 2/1984 | Levine et al. | 380/48 |
| 4,450,573 | 5/1984 | Noble | 375/104 |
| 4,485,486 | 11/1984 | Webb et al. | 455/33 |
| 4,517,561 | 5/1985 | Burke et al. | 340/825.07 |
| 4,534,061 | 8/1985 | Ulug | 455/17 |
| 4,553,262 | 11/1985 | Coe | 455/15 |
| 4,573,206 | 2/1986 | Gravel et al. | 455/34 |
| 4,578,815 | 3/1986 | Persinotti | 455/15 |
| 4,594,591 | 6/1986 | Burke | 340/825.07 |
| 4,612,415 | 9/1986 | Zdunek et al. | 455/33 |
| 4,649,567 | 3/1987 | Childress | 455/17 |
| 4,658,435 | 4/1987 | Childress et al. | 455/17 |
| 4,682,367 | 7/1987 | Childress et al. | 455/17 |
| 4,698,805 | 10/1987 | Sasuta et al. | 370/97 |
| 4,716,407 | 12/1987 | Borras et al. | 340/825.04 |
| 4,723,266 | 2/1988 | Perry | 379/60 |
| 4,817,190 | 3/1989 | Comroe et al. | 455/17 |
| 4,831,373 | 5/1989 | Hess | 455/33 |
| 4,837,858 | 6/1989 | Ablay et al. | 455/34 |
| 4,870,408 | 9/1989 | Zdunek et al. | 455/34 |

FIG. 5

| | 1404 | 1406 | 1408 | 1410 | 1412 |
|---|---|---|---|---|---|
| 1402(0) | Logical ID | Home Group ID | Pointer | Status | Unit Control B. |
| 1402(1) | | | | | |
| 1402(2) | | | | | |
| 1402(3) | | | | | |
| 1402(4) | | | | | |
| ~ | | | | | ~ |
| 1402(n) | | | | | |

| | 1424 | 1420 1426 | 1428 | 1430 | 1432 | 1434 | 1436 |
|---|---|---|---|---|---|---|---|
| 1422(0) | Destination GID | First LID Ptr | Last LID Ptr | Elements Avail. | Retry | Count | Status |
| 1422(1) | | | | | | | |
| 1422(2) | | | | | | | |
| 1422(3) | | | | | | | |
| 1422(4) | | | | | | | |
| ~ | | | | ~ | | | |
| 1422(n) | | | | | | | |

FIG. 7

STATUS BLOCK

| U N U S E D | Active | Fleet Decode Field |
|---|---|---|

1436(a) 1436(b)

1436

MAIN DYNAMIC REGROUP ROUTINE

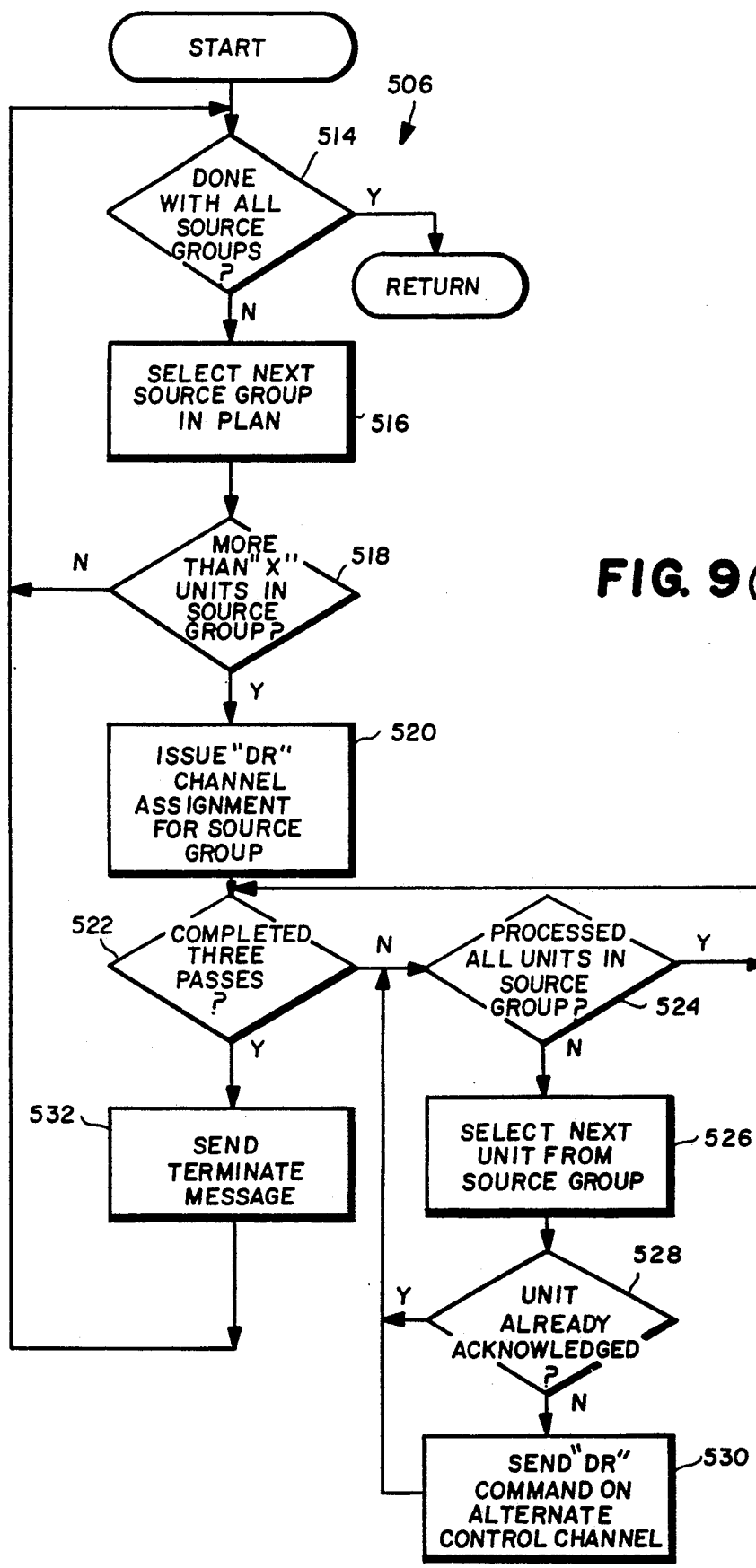
FIG. 9 (PHASE I) (6C)

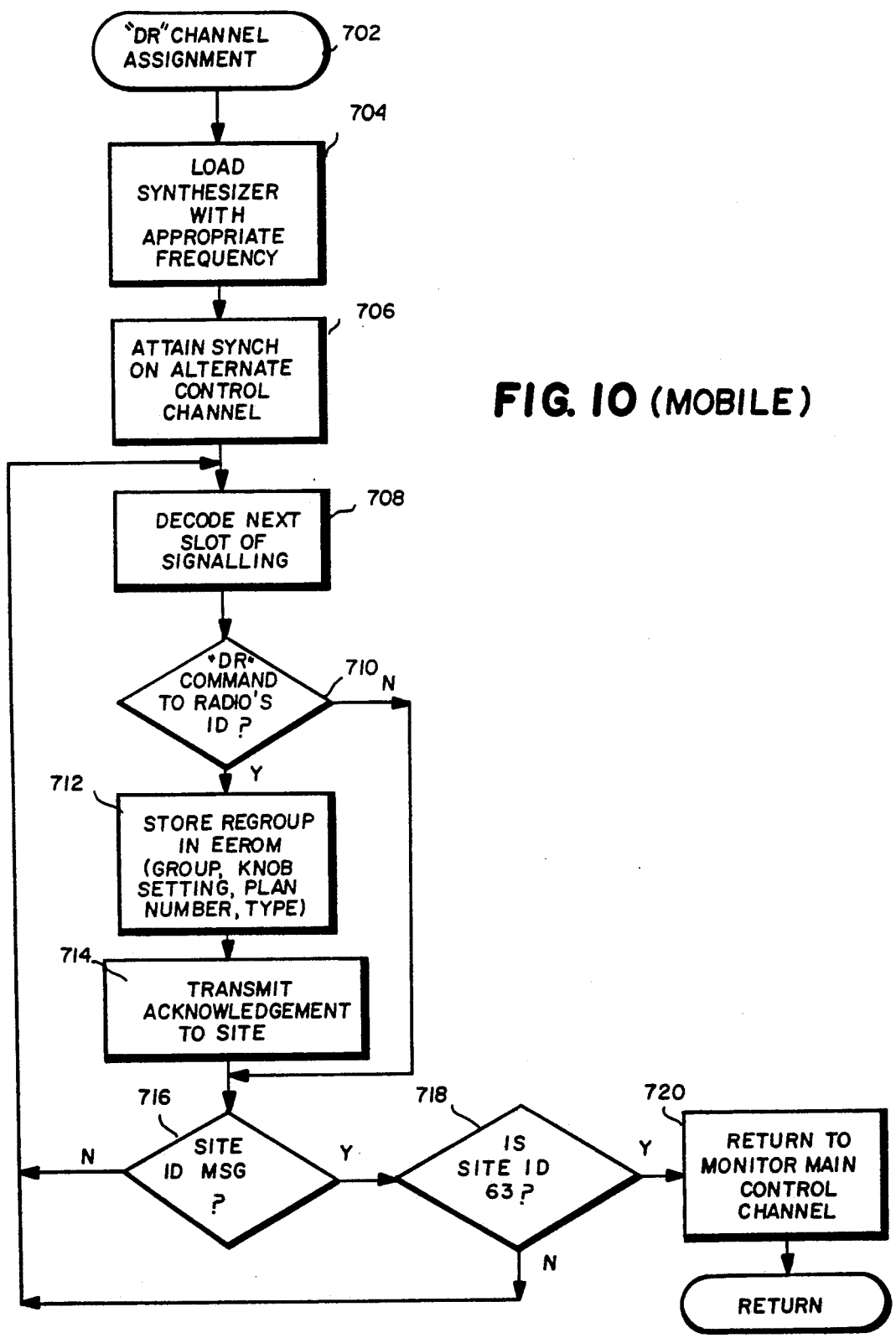
FIG. 10 (MOBILE)

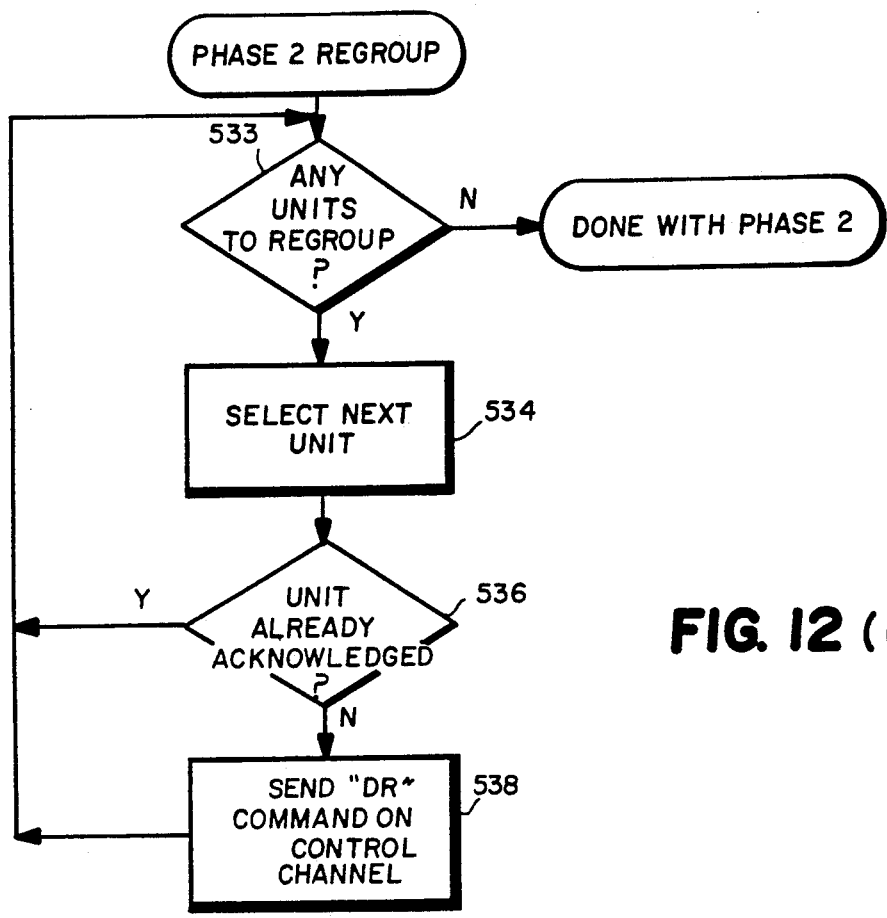
FIG. 12 (6A)
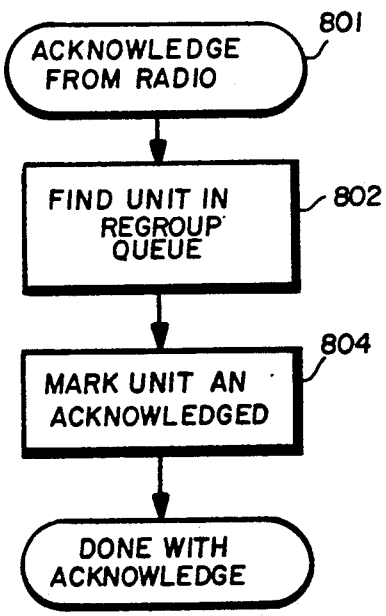
FIG. 11 (PHASE II) (6B)

(BITMAP HANDLING)

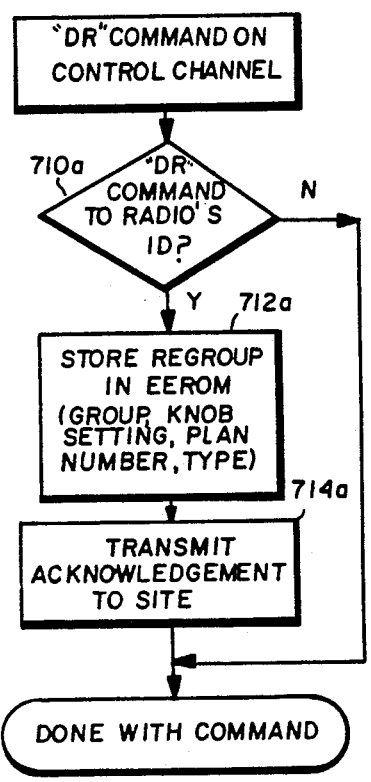
FIG. 13 (MOBILE)(a)
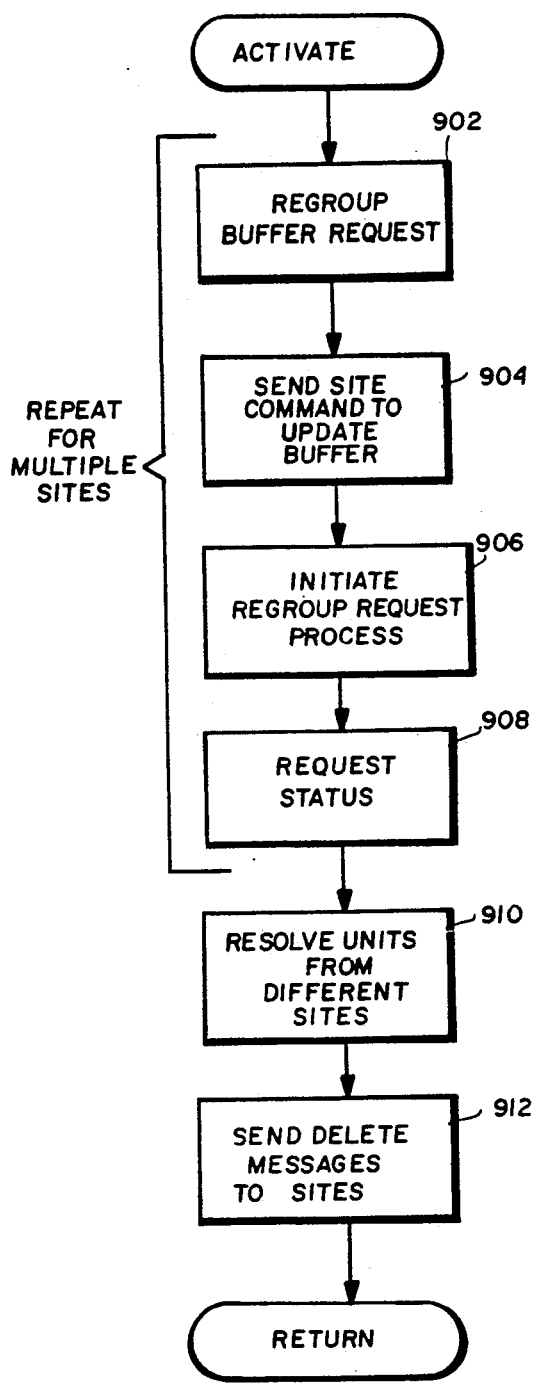
FIG. 16

DYNAMIC REGROUPING IN A TRUNKED RADIO COMMUNICATIONS SYSTEM

CROSS-REFERENCES TO RELATED APPLICATIONS

This application is related to commonly assigned U.S. patent application Ser. No. 085,663 now U.S. Pat. No. 4,903,321 filed on Aug. 14, 1987 entitled "Radio Trunking Fault Detection System". This application is also related to the following commonly-assigned U.S. patent applications all filed on Jun. 3, 1987: application Ser. No. 056,922 now U.S. Pat. No. 4,905,302 of Childress et al entitled "Trunked Radio Repeater System"; Application Ser. No. 057,046 of Childress et al entitled "Failsoft Architecture for Public Trunking System"; Application Ser. No. 056,924 now U.S. Pat. No. 4,821,292 of Childress entitled "Adaptive Limiter/Detector Which Changes Time Constant Upon Detection of Dotting Pattern"; Application Ser. No. 056,923 now U.S. Pat. No. 4,905,234 of Childress et al entitled "Apparatus and Method for Transmitting Digital Data Over a Radio Communications Channel". This application is also related to the following commonly-assigned copending applications filed on Aug. 14, 1987: Application Serial No. 085,572 now U.S. Pat. No. 4,835,731 of Nazarenko et al entitled "Processor-to-Processor Communications Protocol for a Public Service Trunking System"; Application Ser. No. 085,490 now U.S. Pat. No. 4,903,262 of Dissosway et al entitled "Mobile Radio Interface"; and application Ser. No. 085,491 of Cole et al entitled "A Method for Infrequent Radio Users to Simply Obtain Emergency Assistance". This application is also related to U.S. application Ser. No. 181,441 filed Oct. 7, 1987, 1988 entitled "Signalling Protocol for a Trunked Radio Repeater System". The disclosures of each of those related copending patent applications are incorporated by reference herein.

FIELD OF THE INVENTION

This invention is generally directed to the art of trunked radio repeater systems. It is more particularly directed to a trunked radio repeater system arrangement and method which permits individual and groups of mobile radio units to be dynamically regrouped to allow communications between units which cannot normally communicate with one another.

BACKGROUND AND SUMMARY OF THE INVENTION

Radio repeater trunking (time sharing of a single repeater communications channel among many users) is well-known. Early trunking systems used analog control signals while some more recent systems have utilized digital control signals. Control signals have been utilized on a dedicated control channel and/or on different ones of the working channels for various different reasons and effects. A non-exhaustive but somewhat representative sampling of publications and patents describing typical prior art trunked radio repeater systems is identified below:

U.S. Pat. No. 3,898,390, Wells et al (1975)
U.S. Pat. No. 4,392,242, Kai (1983)
U.S. Pat. No. 4,534,061, Ulug (1985)
U.S. Pat. No. 4,649,567, Childress (1987)
U.S. Pat. No. 4,658,435, Childress et al (1987)
U.S. Pat. No. 4,716,407, Borras et al (1987)
JAPAN 61-102836 (A) Ishikawa (May 1986)
U.S. Pat. No. 3,292,178, Magnuski (1966)
U.S. Pat. No. 3,458,664, Adlhoch et al (1969)
U.S. Pat. No. 3,571,519, Tsimbidis (1971)
U.S. Pat. No. 3,696,210, Peterson et al (1972)
U.S. Pat. No. 3,906,166, Cooper et al (1975)
U.S. Pat. No. 3,936,616, DiGianfilippo (1976)
U.S. Pat. No. 3,970,801, Ross et al (1976)
U.S. Pat. No. 4,001,693, Stackhouse et al (1977)
U.S. Pat. No. 4,010,327, Kobrinetz et al (1977)
U.S. Pat. No. 4,012,597, Lynk, Jr. et al (1977)
U.S. Pat. No. 4,022,973, Stackhouse et al (1977)
U.S. Pat. No. 4,027,243, Stackhouse et al (1977)
U.S. Pat. No. 4,029,901, Campbell (1977)
U.S. Pat. No. 4,128,740, Graziano (1978)
U.S. Pat. No. 4,131,849, Freeburg et al (1978)
U.S. Pat. No. 4,184,118, Cannalte et al (1980)
U.S. Pat. No. 4,231,114, Dolikian (1980)
U.S. Pat. No. 4,309,772, Kloker et al (1982)
U.S. Pat. No. 4,312,070, Coombes et al (1982)
U.S. Pat. No. 4,312,074, Pautler et al (1982)
U.S. Pat. No. 4,326,264, Cohen et al (1982)
U.S. Pat. No. 4,339,823, Predina et al (1982)
U.S. Pat. No. 4,347,625, Williams (1982)
U S. Pat. No. 4,360,927, Bowen et al (1982)
U.S. Pat. No. 4,400,585, Kamen et al (1982)
U.S. Pat. No. 4,409,687, Berti et al (1983)
U.S. Pat. No. 4,430,742, Milleker et al (1984)
U.S. Pat. No. 4,430,755, Nadir et al (1984)
U.S. Pat. No. 4,433,256, Dolikian (1984)
U.S. Pat. No. 4,450,573, Noble (1984)
U.S. Pat. No. 4,485,486, Webb et al (1984)
U.S. Pat. No. 4,578,815, Persinotti (1985)

There are many actual and potential applications for trunked radio repeater systems. However, one of the more important applications is for public service trunked (PST) systems. For example, one metropolitan area may advantageously use a single system of trunked radio repeaters to provide efficient radio communications between individual radio units within many different agencies. As is well-known to those familiar with trunking theory, a relatively small number of radio repeaters can efficiently service all of the needs of a public service organization within a given geographic area if they are trunked (i.e., shared on an "as-needed" basis between all potential units).

Before modern trunked radio repeater systems were developed, mobile radio transceivers were provided with crystal controlled frequency synthesizers providing a limited number of fixed transmit/receive channels — and the various channels were assigned for use by different "groups" of radio transceivers. Referring to FIG. 1, for example, fixed channels might be assigned as follows:

channel A to police squad A,
channel B to police squad B,
channel C to rescue squad/paramedics,
channel D to snow removal equipment,
channel E to municipal vehicles,
channel F to fire squad A, and
channel G to fire squad B.

Every mobile transceiver in a group was typically capable of communicating with other members of its group and with a central dispatcher) over its assigned communications channel. In addition, several additional channels were typically provided for "cross-group" communications. For example, an additional channel H might be used to permit members of police squad A and police squad B to communicate with one another — while still permitting squad A to use its privately and exclusively assigned channel A to communicate with other members of squad A without disturbing members of squad B. Similarly, an additional channel I might be provided for communications between fire squads A and B and the rescue squad; and a further channel J might be provided for communications between members of police squad A and/or B, the rescue squad, and members of one or both fire squads.

This type of arrangement, although certainly providing private and reliable communications, had some severe disadvantages. One disadvantage was that the "cross-group" channels were usually under-utilized (since most routine communications take place within a group), but often became extremely congested during disasters or emergencies requiring coordination between members of different groups. Moreover, "cross-group" communications typically required some degree of advanced cooperation on the part of each and every member involved (e.g., each user had to properly switch his transceiver to the "cross-group" channel or be sure his "scanning" type transceiver was enabled to monitor that "cross-group" channel). Suppose, for example, that a police officer in police squad A wished to communicate with a rescue vehicle in the rescue squad. The police officer could switch his transceiver to communications channel J and call the rescue vehicle he wished to communicate with — but there was no guarantee that the specific rescue vehicle he was trying to reach would in fact be monitoring channel J (since the rescue vehicle driver would first have to change his channel selector to channel J as well). Central dispatchers often had the burden of manually directing the various different personnel to cross-group channels, and much time was wasted coordinating such efforts when emergency or disaster situations made time of the essence.

In contrast to the old crystal controlled fixed frequency systems, prior art trunked radio repeater systems rely upon preprogrammed group identifications rather than preset operating frequencies to provide the communications partitioning shown in FIG. 1. Trunked radio communications systems assign communications channels on an "as needed" basis for the exclusive use of calling mobile units requesting communications and to the group of mobile units being called. It is possible to provide much additional flexibility by pre-programming mobile units in advance with several different group identifications (thus making a given mobile unit a "member" of several different groups of transceivers). Since the number of groups the system can support is limited only by the RF signalling protocol providing identification of groups (and the programming capabilities of the mobile transceivers), it is possible to provide an almost arbitrarily large number of different logical groupings of transceivers — for example, the assignee's signalling protocol disclosed in U.S. application Ser. No. 056,922 to Childress et al entitled "Trunked Radio Repeater System" filed Jun. 3, 1987 and U.S. application Ser. No. 181,441 to Childress entitled "Trunked Radio Repeater System" filed Oct. 7, 1987 provides for individual identification of each and every mobile transceiver in the field and supports over 4000 different groups.

This trunked arrangement provides for much additional flexibility. For example, referring again to FIG. 1, a first group might be formed by all members of police squad A; a second group might consists of all members of police squad A and B; a third group might consist of a subset of police squad A (e.g., certain detectives and a supervisor); a fourth group might consist of all police supervisors from squads A and B; and a fifth group might consist of all members of police squad A and all members of the rescue squad.

Even though all groups are in effect "reusing" the same communications channels in this trunked radio system, the trunking is mostly transparent to individual users. That is, when a police officer in police squad A switches his "channel" (actually group) selector switch to correspond to the first group and actuates his "push-to-talk" microphone switch to make a call, his transceiver and all other active transceivers of police squad A are automatically controlled to switch to a free "working" channel temporarily dedicated to their use — and significantly, no other mobile transceivers are permitted to monitor or participate in the communications over this channel. This privacy feature afforded by trunked communications systems is important for providing each group of users with efficient, reliable communications, is critical for certain sensitive communications services (e.g., the police narcotics and detective squads) and is also critical for preventing interference from other users (e.g., the driver of a snow removal vehicle cannot interfere with communications between members of police squad A no matter what the snow truck driver does with his transceiver). Thus, in this respect the trunked system behaves from a user's view point like the prior systems in which each service had a channel dedicated to its exclusive use — while providing the radio spectrum and cost economy derived from channel and repeater sharing.

In a trunked environment, compartmentalizing radio transceivers into groups is essential to effective, reliable, private communications. In the past, however, such compartmentalization resulted in serious inflexibility when special situations arose. In most prior systems, all groupings of radio transceivers had to be defined beforehand (e.g., by hardwiring or preprogramming at the time the transceivers were issued to users and placed in the field). For example, when a police officer in squad A was issued his radio transceiver, the transceiver would typically be preprogrammed to respond to calls for certain groups and to never respond calls for other groups. A disaster situation (plane crash, major fire, landslide, earthquake, etc.) or a special event (e.g., county fair, parade and the like) might require this police officer to communicate with other users he normally does not communicate with. For example, those assigned to crowd control at a special event such as a parade might include a squad A police officer, a rescue squad vehicle, several municipal vehicles, and an officer from police squad B. It would be highly desirable to permit these different users to communicate with one another over their own communications channel for the duration of the special event without disturbing or interfering with communications of the rest of the two police squads, the rescue squad and the municipal vehicles.

Prior trunked repeater systems sometimes provided the capability of combining several groups together into a large group via a multiple group call — so that all members of, for example, police squad A, the rescue squad, all municipal vehicles and all members of police squad B could be collected onto a single communications channel in response to a single (typically dispatcher initiated) "multiple group call". The problem with this approach is that it involves too many radio users to be effective (i.e., many more than are needed for the necessary communications) — and more seriously, may draw users not involved in the necessary communications away from other radio calls important to them. The only really effective way in the past to accomplish the desired result was extremely inconvenient and costly — issuing each of the users a "floater" transceiver specially programmed for a spare group (and making sure they each returned their transceiver at the end of the special event).

The concept of "dynamic regrouping" in a trunked radio system is generally known. Dynamic regrouping allows a system operator to program customized group identifications into radio transceivers in the field from the central system facility at will — and dynamically form special groups for special purposes. Disasters such as plane crashes, severe storms, major fires, landslides and earthquakes as well as special events are all examples where the ability to quickly reconfigure radios could be a valuable tool to the public safety officer. As an example, personnel involved in handling the crisis of a plane crash might include certain police officers, certain rescue vehicles, certain municipal vehicles and certain fire vehicles. It would be highly advantageous to provide some way to reconfigure the fixed, compartmentalized groups of transceivers normally provided by a trunked system to dynamically form special groups consisting only of these involved radio units — while preserving the units' existing group classifications (and thus, in some cases, their capability to make routine calls) and also without disrupting any other communications taking place on the system.

The need for dynamic regrouping typically arises when dispatchers and field personnel are under tremendous pressure to perform under unpredictable conditions. The trunked communication system should help alleviate confusion rather than contribute to it — so that if dynamic regrouping is to be implemented at all, it must occur rapidly and predictably and in a fashion that can be monitored and controlled by any supervisor. It is especially important that activating a dynamically created group ("regroup") does not interfere with any ongoing radio communications in the field. Unfortunately, existing techniques for implementing dynamic regrouping have not met these demanding requirements and have therefore caused dynamic regrouping to remain in the realm of merely a great idea that cannot be practically implemented in the form of a usable tool.

Motorola, Inc. of Shaumburg, Ill., has developed a so-called "SMARTNET" trunked radio communications system which offers a limited dynamic regrouping capability. The optional dynamic regrouping capability provided in this 800 MHz trunked system allows the dispatcher to reassign radios into new talk groups without any mobile operator involvement to provide communications flexibility during emergency situations. Motorola's subscriber dynamic regrouping communications system is described in WO PCT Patent Publication No. 8701537 published Mar. 12, 1987 entitled "Method For Dynamically Regrouping Subscribers On A Communications System", and in press releases dated Aug. 6, 1987 and Jun. 27, 1986.

Briefly, the Motorola scheme provides for downloading a single dynamic reprogramming instruction to specified individual radio transceivers in the field via digital messages transmitted over the control channel to each of the transceivers individually. Upon receipt of the reprogramming message, the individual transceivers acknowledge the message, store the downloaded dynamic regroup identifier in an internal memory, and switch to a dynamic regroup mode in which they transmit and receive using the dynamic group instead of their old group(s). In another mode, a "group" dynamic regroup message is transmitted to an entire group of transceivers at a time in order to increase regrouping speed. The receiving transceivers begin using an alternate, fixed "dynamic code" previously programmed at time of manufacture and/or "personality PROM" programming. The units continue to use this "dynamic code" until dynamic regrouping messages cease being periodically transmitted over the control channel.

AmeriCom Corp. of Atlanta, Ga., has advertised an RF communications system featuring "over-the-air" reprogramming to add channels and reprogram mobiles without expensive ROM changes." This feature is described as providing more responsive service by dynamically reprogramming mobiles in order to lower service costs and permit real time "over-the-air" reprogramming of radio configurations and permissions.

The following issued U.S. Patents may also be generally relevant to the concept of dynamic regrouping:
U.S. Pat. No. 4,594,591 to Burke
U.S. Pat. No. 4,517,561 to Burke et al
U.S. Pat. No. 4,152,647 to Gladden et al
U.S. Pat. No. 4,612,415 to Zdunek et al
U.S. Pat. No. 4,427,980 to Fennel et al
U.S. Pat. No. 4,553,262 to Coe Unfortunately, existing dynamic regrouping schemes (such as those described above) exhibit many practical problems when they are actually used in the real world. For example, existing techniques do not meet the demanding requirements of rapid and predictable regrouping which can be monitored and controlled by any supervisor — and which does not interfere with ongoing radio communications in the field.

The user interface has been one of the more widely and strongly criticized elements in existing dynamic regrouping schemes. Some criticize the user interface itself and others criticize the entire regrouping process because it is too confusing to be of any value. Existing dynamic regrouping schemes require a supervisor to specify "regroups" (new, dynamically configured groups) from the "ground up" by keying in an identification for each and every individual radio transceiver to be placed in the regroup — a difficult task to perform under time pressures of an emergency. Because dynamic regrouping changes the way the communications system operates on a very fundamental user level, for any practical and useful dynamic regrouping scheme the supervisor and the system dispatchers must be capable of: (a) accurately tracking — on an interactive basis — what radios are in what groups, (b) quickly assessing whether the regrouping process is proceeding in a suitable fashion or should instead be aborted or altered, and (c) easily altering regroup plans during activation or after they have been activated in response to changes in conditions and personnel. System supervisors and dispatchers must also be able to effectively handle and control communications during the regrouping process which, once initiated, causes entire groups to become fragmented and undefined until the process is complete. Existing dynamic regrouping systems simply do not meet these needs.

Additional complexity arises from the fact that most modern trunked communications systems serve a sufficiently large geographical service area to require multiple repeater sites — and it is not possible to determine which users are being served by which sites at the time dynamic regrouping is activated. Existing dynamic regrouping systems provide no quick and efficient way to set up and execute dynamic regrouping plans having no conflicting regrouping requests relative to any of the mobile transceiver involved. Very serious problems could also arise in existing systems if a site controller fails either while radios are being dynamically regrouped or after they have been regrouped.

Another serious inadequacy of prior dynamic regrouping schemes is the lack of support offered to field personnel. For example, the capability of placing only one dynamically configured group assignment in a transceiver at any time is generally insufficient. In an emergency, key personnel must be able to switch between two or more of "regroups" — but if their radio transceivers can accept only one regroup at a time, this switching is impossible. The police chief, the supervisors and other key personnel with the most knowledge, information and tactical experience become hamstrung because they are unable to participate in communications in more than one of the new dynamically configured groups.

Perhaps the most serious shortcoming of the existing dynamic regrouping schemes is that they often force users into "immature" groups for relatively long time periods. The dynamic regrouping process takes some time to complete in any system. An immature group is a group that is in the process of being formed by the regrouping process but because it is only partially formed, does not yet include enough transceivers to be an effective or usable group. The result is a temporary loss of communications effectiveness as transceivers are removed from existing groups and placed into a new group — where they must wait for the regrouping process to reach some sufficient level of completion before effective communications can be established.

For example, assume an officer in the field is involved in a communique exchange and suddenly finds his transceiver automatically locked in a "regroup" with only one or two other transceivers. The system has not yet regrouped other radios into this new group, so he cannot yet communicate effectively in the new group — and he also cannot communicate in the old group his transceiver was just removed from because the dynamic regrouping scheme has forced him into priority communications with the regroup. Meanwhile, the dispatcher has no idea at any given time who has or hasn't yet been regrouped, and therefore does not know what groups to talk to reach specific personnel. A solution to this problem offered by the prior art is to permit each transceiver to generate a "reprogram request" which the dispatcher must manually respond to. This is hardly an effective solution for the officer in the field during an emergency.

One way to lessen the bad "side effects" of the dynamic regrouping process is to make the occur as rapidly as possible. Unfortunately the task of reaching and remotely reprogramming, in a reliable manner, tens or hundreds of geographically scattered transceivers is a difficult task to accomplish at any speed, let alone as rapidly as possible. The flow of information from the regrouping terminal to the repeater site or sites, the rate at which transceivers can be regrouped, and the resulting loading of the digital control channel (which adds to existing control channel loading from other communications the system is supporting) are interrelated items that must work together effectively if the regrouping process is to proceed effectively. The regrouping process should occur as rapidly as possible to minimize the amount of confusion it creates. Unfortunately, existing dynamic regrouping schemes have not been designed with the real world in mind. Regrouping over the control channel limits the rate at which radios can be regrouped to only a few per second at best (due to the limited data transfer rate over the control channel and normal control channel loading). This limited regrouping rate is further aggravated by requiring the regrouping terminals to send initial requests via the control channel. Of course, multi-site configurations require regrouping terminals in the range of each individual site — hardly an effective or efficient solution.

The present invention provides an improved dynamic regrouping scheme which includes an effective user interface, automatic support of multi-site systems, the capability to program individual radio transceivers with multiple new groups dynamically, a fast rate of reconfiguration, instantaneous switch over to prevent radios from residing in immature groups, and a satisfactory mode of operation should the site controller (or site controllers in non-fault tolerant systems) fail. Some of the features and performance specifications provided by the presently preferred exemplary embodiment of the present invention include:

Features

Unlimited prestored plans
Unlimited source and destination groups per plan
Regrouping at the plan or destination group level
Advanced user interface
Automatic support of multiple sites
Fast regrouping
    Regrouping at a rate of over 30 radios
    per second is possible while reducing
    loading on the control channel.
Fast activation/deactivation
    Each plan can be immediately activated or deactivated. Users are effectively regrouped together.
Up to 8 regroups per radio
    If a radio does need multiple regroups, the user interface allows the supervisor to specify the knob setting for each regroup.

In accordance with one significant feature of the invention, dynamic regrouping is permitted to proceed extremely rapidly with very little additional loading on the digital control channel and without being affected by existing control channel loading. Dynamic regrouping takes place in two phases in the preferred embodiment. In "phase I", a special dynamic regroup call is transmitted over the control channel which directs an entire transceiver "source group" to a working channel (this source group is defined, in terms of a "normal", existing transceiver group). Typically, only some and not all of the transceivers in the "source group" are actually to be dynamically regrouped. All of the transceivers in the source group react by retuning to a further communications channel normally used by the system as a working channel — just as they would for a "normal" group call. However, the further communications channel has meanwhile been reconfigured by the system as an alternate control channel — and carries all of the control channel signalling needed to efficiently handshake with and transfer messages to and from the transceivers (the alternate control channel is distinguishable from the "real" control channel so that transceivers from different groups do not mistake the alternate control channel for the "real" control channel). Since the alternate control channel to handles only messages for regrouping selected members of the source group and is not loaded with control messages for other systems communications (and also because of the 9600 bps data control channel transfer rate of the preferred embodiment), dynamic regrouping messages transmitted over the alternate control channel can "regroup" transceivers on an individual basis extremely rapidly (e.g., 30 or more transceivers per second).

The communications system can activate as many alternate control channels simultaneously as desired — and thus simultaneously dynamically regroup many different source groups each containing tens or hundreds of transceivers.

Not all required transceivers typically respond to a dynamic regroup call issued at a given site at a given time. Some transceivers may be in the service range of a different repeater site, other transceivers may be inactive (e.g., "off"), and still other transceivers may be temporarily unavailable (e.g., blocked by an obstruction from communicating with the site). In accordance with another feature of the invention, a central regrouping terminal constantly monitors the progress of the regrouping process, and coordinates the process between different sites in a multi-site configuration. After (or during) phase I of the regrouping process is completed, the central terminal causes the system to begin "phase II" in which the alternate control channel is released and dynamic regrouping messages are periodically sent over the main control channel — but only to those few individual transceivers that failed to respond to the phase I messages (the number of transceivers that "missed" the phase I signalling will generally be relatively small, so that the main control channel is not overloaded or backed up with dynamic regrouping messages and acceptable control channel message handling rates can be maintained for routine communications as well as for the phase II dynamic regroup messages).

In accordance with still another feature of the invention, dynamic regroup activation does not actually occur in either phase I or phase II in order to avoid the formation of immature regroups. Phase I and phase II of the process simply make the new "regroup" information "resident" in the transceivers being regrouped — and the system automatically keeps track of which transceivers have actually responded. A regroup is not activated until (a) a sufficient number of transceivers in the regroup have responded, and (b) certain transceivers specified as being critical to the effectiveness of the regroup have responded. When both of these requirements have been met, a further message transmitted over the main control channel to the source groups forming the regroup cause all of the transceivers previously made "resident" in the regroup to immediately activate the regroup. Multiple regroups can be active and/or "resident" on the system simultaneously.

Meanwhile, a system manager may interactively monitor and modify the regrouping process as it progresses through an advanced user interface which is a further feature of the invention. The user interface provides instantaneous status information regarding what units have been made "resident", what units have become active in a regroup, and what units are still being searched for. The system manager can alter the regrouping process as it progresses (e.g., abort the process, delete certain units from the regroup and add other units, etc.). The system manager can also easily remove units from and add units to an active regroup at will.

In accordance with still another feature of the invention, the advanced user interface permits a user to specify regroups on several different levels. In particular, the dynamic regrouping process is defined in terms of plans, source groups and destination groups ("regroups"). Each regroup plan may specify multiple destination groups — and the system manager may activate the entire plan, or only some of the destination groups in the plan. Significantly, the system manager specifies what transceivers are in a particular destination group by specifying the "source" group (i.e., normal group classification) of those transceivers. As each source group is selected, all transceivers in the source group are listed on a display and the system manager can select some and omit others from the destination group. The source groups selected in this manner are the same ones called in "phase I" of the dynamic regrouping processes discussed above.

Any given transceiver can be included in multiple regroups simultaneously, and the advanced user interface permits the system manager to allocate specific regroups to specific positions on the group selector control knobs and also make regroups mandatory or user selectable (e.g., to specify whether the user is forced into a regroup and/or can tune to a different group once regrouped) on a transceiver by transceiver basis. This flexibility permits the system manager to avoid conflicting transceiver regroup assignments and actually define to some extent the manner in which the transceiver operators interface with the reconfigured system.

In accordance with a further feature of the invention, both handshaking and non-handshaking dynamic regroup deactivation is provided. The preferred technique for deactivating an active regroup is to perform a signalling exchange similar to the "phase I" signalling used for making a dynamic regroup "resident" — and positively deactivate the regroup in each transceiver with each transceiver positively acknowledging deactivation. However, to prevent regrouped transceivers that "miss" the deactivation signalling from becoming trapped in dynamic regroup "limbo", a further means to deactivate regroups is also provided. A message is periodically transmitted over the main control channel specifying on a plan-by-plan basis which plans are active and which plans are inactive (and also which plans are "resident" and which plans are non-resident). Such message transmission is maintained long after dynamic regroup plans are deactivated. Any transceiver active in a regroup which receives a message specifying that the regroup is inactive immediately deactivates the regroup — thus providing an immediate, "fail-safe" way to deactivate regroups (e.g., if the system manager panics) and to also deactivating regroups in transceivers that "missed" the handshaking deactivation signalling.

These as well as other features and advantages of this invention will be more completely understood and appreciated by carefully studying the following detailed description of the presently preferred exemplary embodiment taken in conjunction with the accompanying drawings, of which:

FIGS. 5-7 are schematic flowcharts of exemplary data structures maintained by site controller 410 for implementing dynamic regrouping functions;

Figure 14:
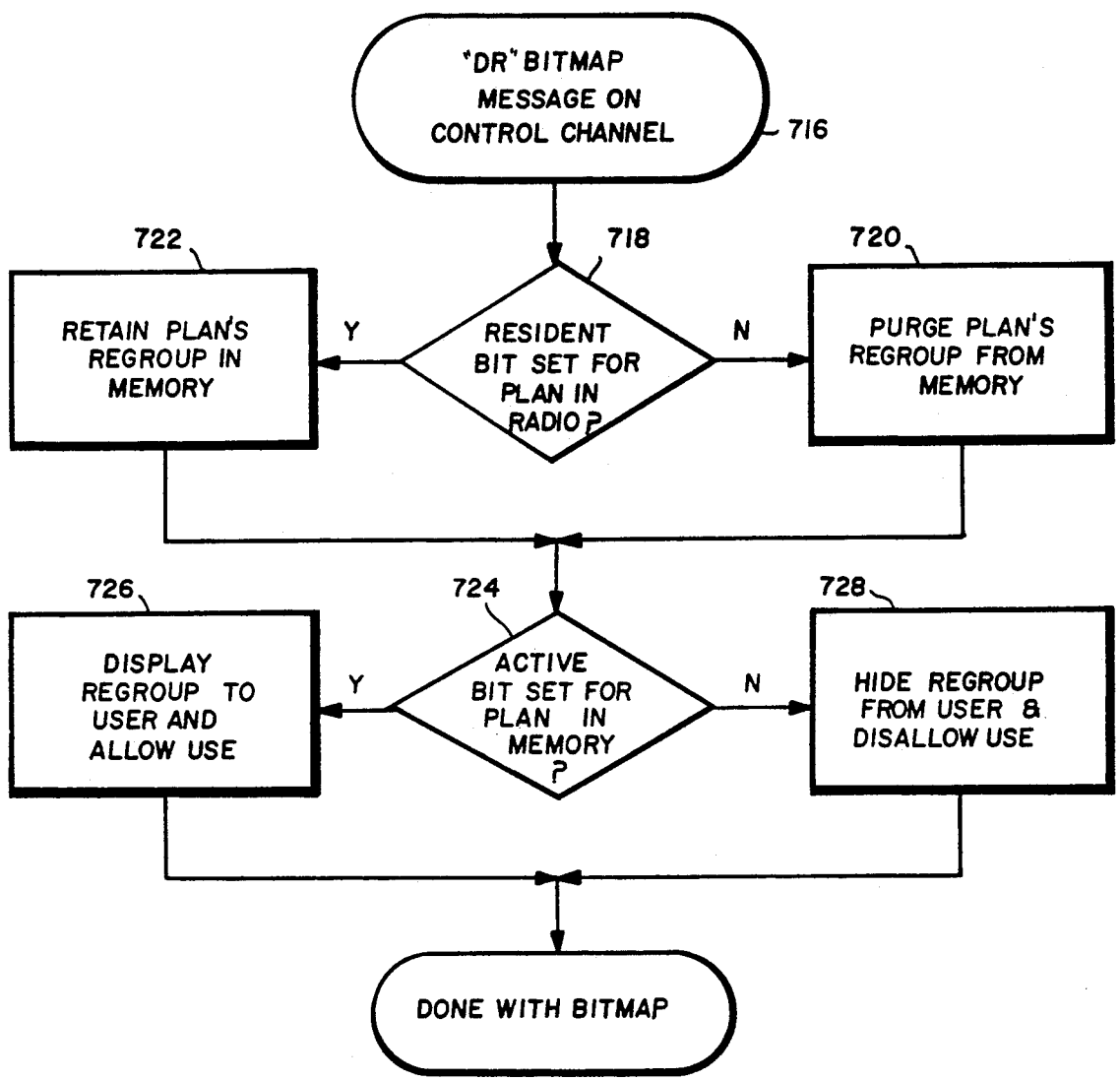
Figure 15:
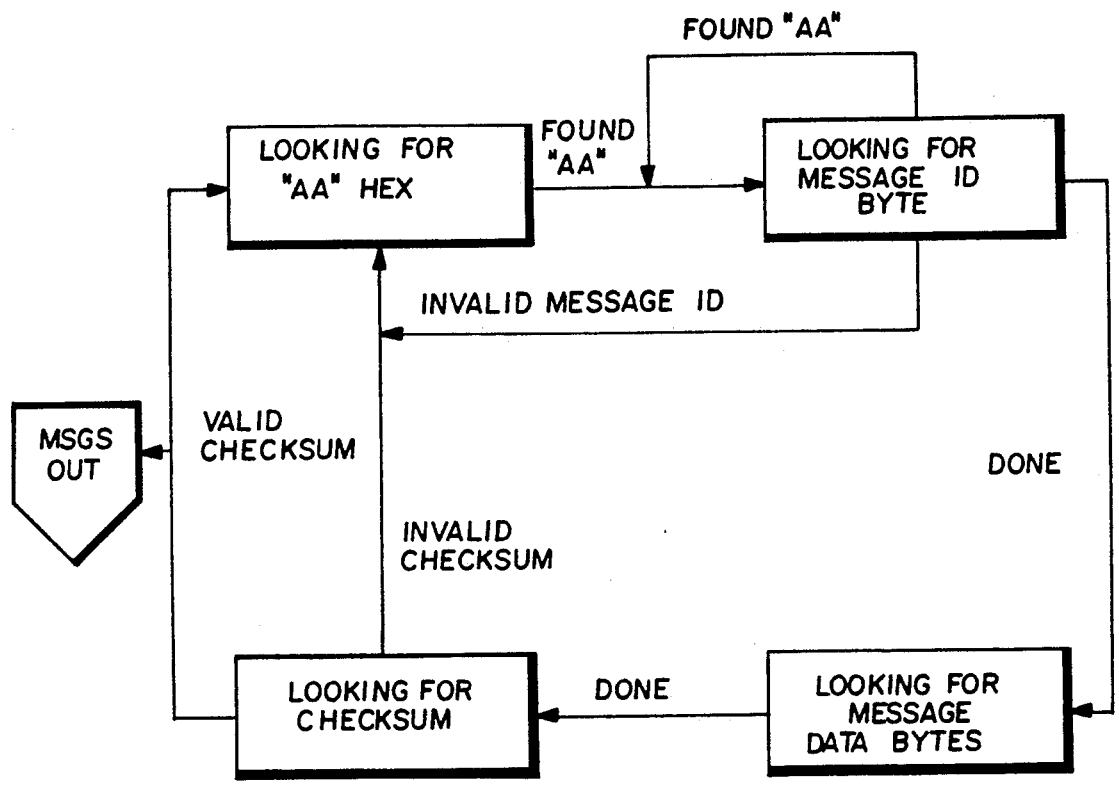

FIGS. 8-14 are flowcharts of exemplary program steps performed by site controller 410 and mobile/portable radio transceivers 150 to implement the dynamic regrouping features provided by the present invention; and FIGS. 15-16 are flowcharts of exemplary program control steps performed by system manager 416 and site controller 410 to implement the dynamic regrouping features provided by the present invention.

DETAILED DESCRIPTION OF PRESENTLY PREFERRED EXEMPLARY EMBODIMENTS

OVERALL SYSTEM ARCHITECTURE

Figure 2:
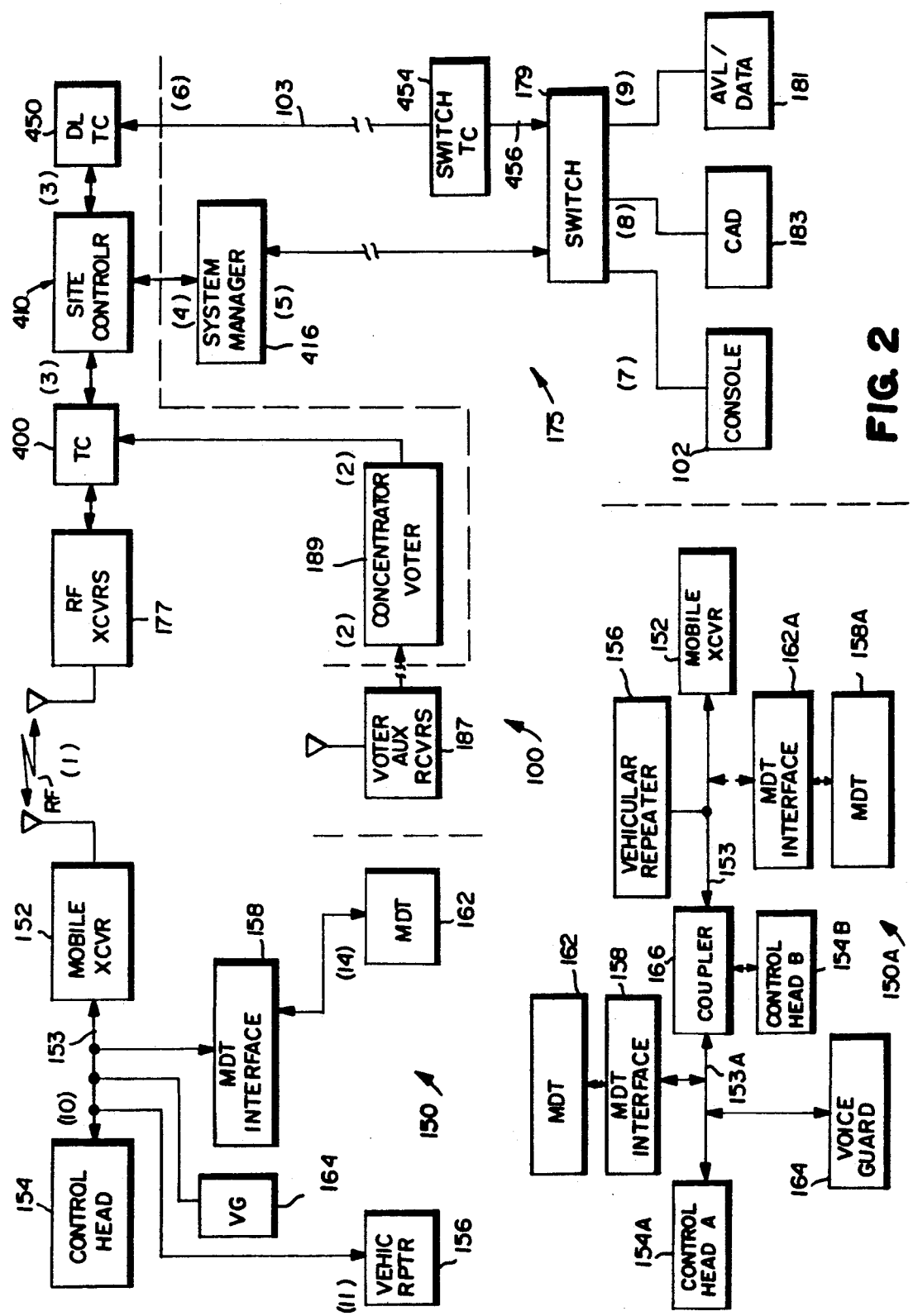
FIG. 2 is an overall block diagram of a digitally trunked radio repeater system with dynamic regrouping capability in accordance with the presently preferred exemplary embodiment of the present invention.

An exemplary trunked radio repeater system 100 in accordance with this invention is generally depicted in FIG. 2. System 100 includes at least one (and typically many) mobile (or portable) radio transceiving stations 150 and at least one (and typically many) RF repeater stations 175. Mobile transceiving station 150 communicates via an RF link and repeater station 175 with other mobile transceiving stations and/or with landbased parties connected to the repeater station by conventional dial-up landlines.

Figure 1:
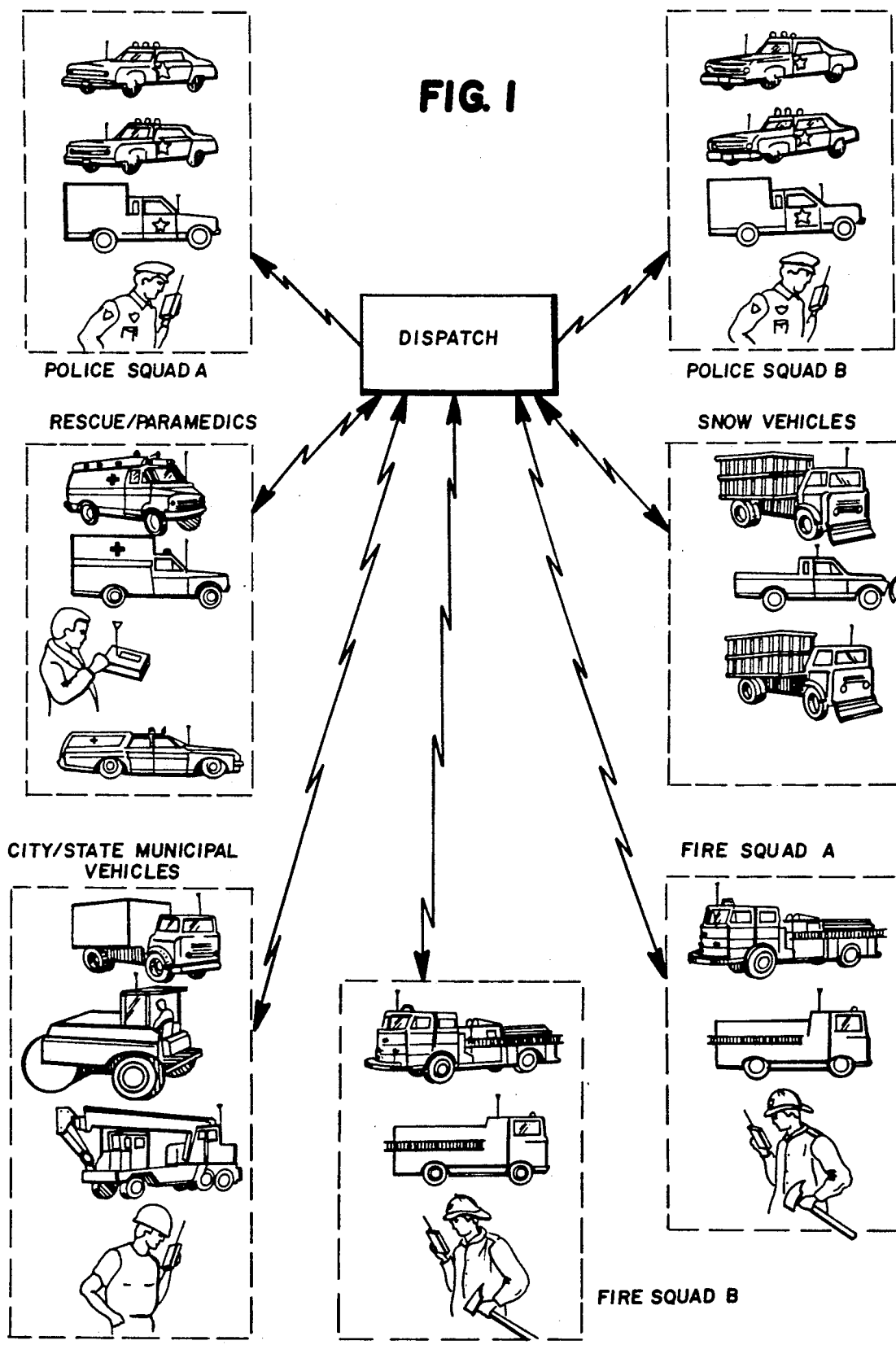
FIG. 1 is a schematic diagram of simplified exemplary user groupings in a typical trunked radio repeater system.

Repeater station 175 includes a site controller 410, individual repeater channel transceivers 177, and a multiplexing telephone interconnection network ("switch", or "MTX") 179. Site controller 410 is preferably a mainframe digital computer which oversees the general operation of repeater station 175. In particular, site controller 410 controls the operation of RF transceivers 177 by transmitting digital signals to and receiving digital from "trunking cards" ("TC") 400 connected between the site controller and individual transceivers (although only one transceiver 177 and one trunking card 400 are shown in FIG. 1, there typically are many such trunking card/transceiver combinations in repeater station 175 — one for each RF channel the repeater station operates on).

Site controller 410 communicates with one or more dispatch consoles 102 via a "downlink" 103 which includes a "downlink" trunking card 450 and a "switch" trunking card 454. The downlink 103 also typically is channeled through switch 179. Also connected to switch 179 are AVL (automatic vehicular locating system) 181 and CAD (computer aided dispatch system) 183. A system manager computer system 416 (hereafter referred to as the "system manager") is connected to site controller 410 and to switch 179 to allow a system manager to oversee and control the overall operation of system 100 — and to control the dynamic regrouping process.

A remote receiver 187 and associated concentrator/voter 189 may be connected to trunking card 400 to allow so-called "RSSI" signal strength measurements to be based on the stronger of the signal level received at the central repeater station site and the signal level received at a remote site — thereby increasing the reliability of such measurements.

An RF link ("RF") connects RF repeater transceivers 177 with mobile transceiving stations 150. Mobile station 150 is capable of transmitting digitized voice or digital data signals (encrypted or unencrypted) to and receiving such signals from repeater station 175 over the RF link.

In configuration shown in the upper left-hand portion of FIG. 2, mobile station 150 includes a mobile RF transceiver 152 connected to a control head 154 via a serial digital bus 153. Mobile transceiver may also be connected to a vehicular repeater 156 via the serial bus. A mobile data terminal interface 158 may connect the serial bus to a mobile data terminal (MDT) 162. A separate digital voice guard module 164 performs data encryption and decryption on digitized voice and/or digital data signals using the conventional DES algorithm.

In the alternate mobile radio configuration shown in the lower left-hand corner of FIG. 2, a coupler 166 is used to connect dual control heads 154A, 154B to serial bus 153. In this configuration, a mobile data terminal 162 and associated interface 158 may be connected directly to serial bus 153 and/or to bus 153A (on the output of the coupler 166). Voice guard module 164 is preferably connected to bus 153A when dual control heads 154A, 154B and associate coupler 166 are used.

As illustrated, individual radio units (mobile or portable radio transceivers) of various groups communicate with one other (both within and possibly outside of their own groups) via shared radio repeater channels. A dispatch console 102 supervises the operation of repeater system 102. There may be multiple dispatch consoles 102 (one for each separate fleet of mobile/portable units) and a master or supervisory dispatch console for the entire system if desired. Systems manager 416 is capable of specifying new groupings and causing such new groupings to be dynamically activated on command, as will be explained shortly.

CENTRAL SITE ARCHITECTURE

Figure 3:
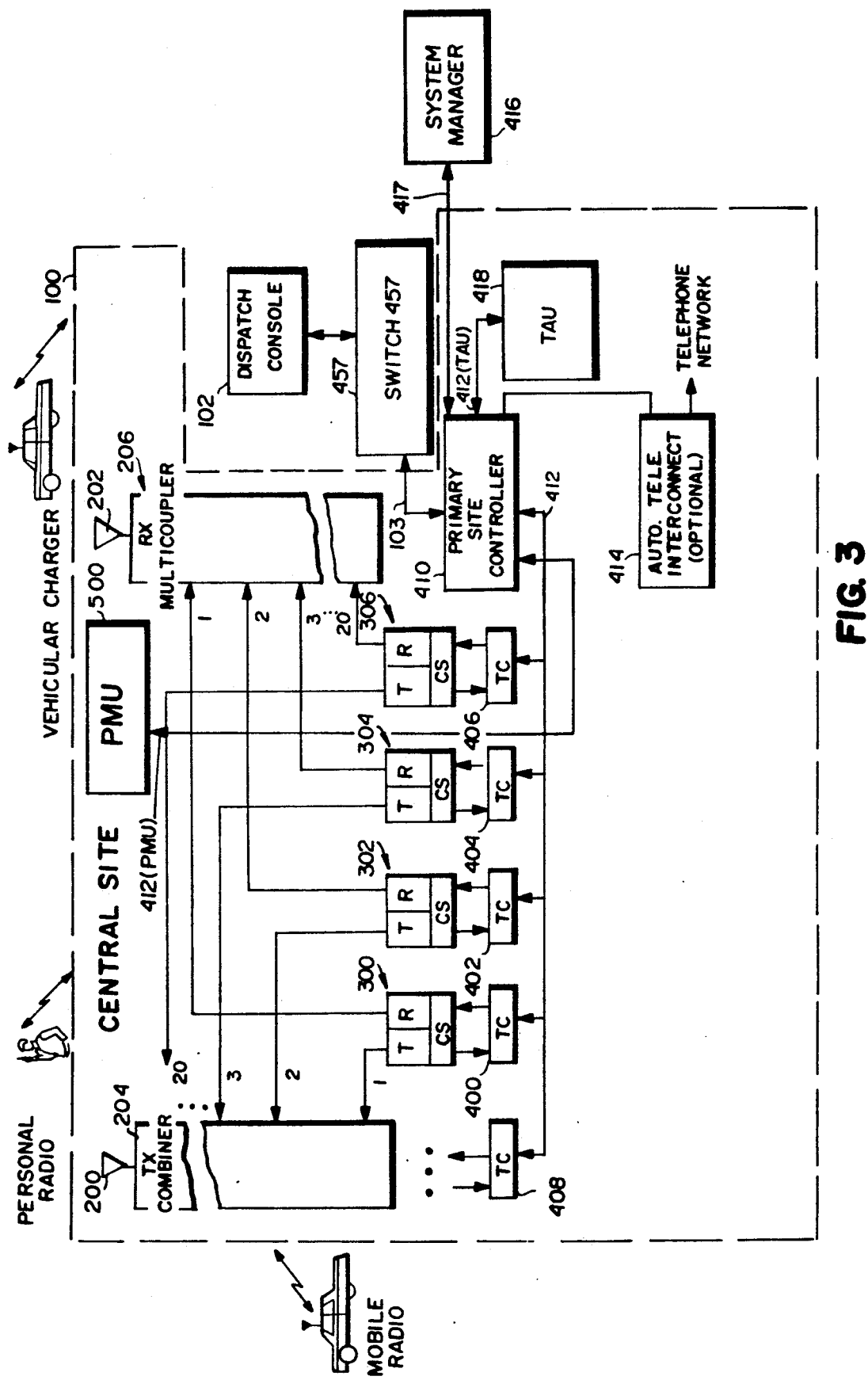
FIG. 3 is more detailed schematic block diagram of the repeater site architecture shown in FIG. 2.

Briefly, referring now more particularly to FIG. 3 (a block diagram of a single repeater site of which typical systems may have more than one), a transmitting antenna 200 and receiving antenna 202 (which may sometimes be a common antenna structure) may be utilized with conventional signal combining/decombining circuits 204, 206 as will be apparent to those in the art. The transmitting and receiving RF antenna circuitry 200-206 thus individually services a plurality of duplex RF channel transmit/receive circuits included in a plurality of RF repeater "stations" 300, 302, 304, 306, etc. Typically, there may be 24 such stations. Each station transmitter and receiver circuitry is typically controlled by a dedicated control shelf CS (e.g., a microprocessor-based control circuit). Such control shelf logic circuits associated with each station are, in turn, controlled by "trunking cards" TC (e.g., further microprocessor-based logic control circuits) 400, 402, 404 and 406. Another trunking card 408 may be dedicated for digital data communications if desired.

All of the trunking cards 400-408 communicate with one another and/or with a primary site controller 410 via control data links 412. The primary site controller (and optional backup controllers if desired) may be a commercially available general purpose processor (e.g., a PDP 11/73 processor with 18 MHz-J11 chip set). Although the major "intelligence" and control capability for the entire system resides within controller 410, alternate backup or "fail soft" control functions are incorporated within the trunking cards 400-408 so as to provide continued trunked repeater service even in the event that controller 410 malfunctions or is otherwise taken out of service.

An optional telephone interconnect 414 may also be provided to the public switched telephone network. A system manager 416 is also provided for overall system management and control (together with one or more dispatcher consoles 102).

A power monitoring unit (PMU) 500 allows site controller 410 to monitor the actual RF parameters associated with repeater system 100. For example, PMU 500 constantly monitors power output of each repeater channel, as well as insertion loss and VSWR (voltage standing wave ration) of each repeater antenna. PMU 500 is connected to site controller 410 via a high speed data link 412 (PMU).

A test, alarm and control unit (TAU) 418 is provided for detecting and diagnosing error conditions.

RF SIGNALLING ARRANGEMENT AND PROTOCOL

The RF signalling protocols and formats used in the preferred embodiments are described in detail in co-pending commonly assigned application Ser. No. 181,441 filed Apr. 14, 1988 entitled "Trunked Radio Repeater System, the entire disclosure of which is incorporated herein by reference as if expressly set forth herein.

Briefly, all inactive radio transceivers monitor a digital RF control channel for messages which identify groups the transceivers are members of. To establish "normal" communications between a mobile transceiver and other transceivers within its group, the mobile transceiver transmits a channel request message over the control channel. In response, the site transmits a channel assignment message directed to the transceiver group — this assignment message specifying a free working channel. All of the transceivers in the group react to this channel assignment message by re-tuning to the specified working channel. Voice and/or data communications are permitted between the transceivers in the group over the working channel after various handshaking signalling has been exchanged.

The signalling protocol described in the above-mentioned copending copending application Ser. No. 181,441 has been supplemented with several additional messages used to implement dynamic regrouping. Exemplary message formats for those messages appear below.

OUTBOUND CONTROL CHANNEL MESSAGES

Dynamic Regroup

```
Message #1
FORMAT: 27 . . . . . . . . . . . . . . . . . . . . 0
       111                      MT-A
         111                    MT-B
           10000                MT-D
             fff                Number of fleet bits
               1111111111111    Logical Message #2
```

-continued
OUTBOUND CONTROL CHANNEL MESSAGES

Dynamic Regroup

```
FORMAT: 27 . . . . . . . . . . . . . . . . . . . . 0
       111                      MT-A
         111                    MT-B
                                Partial MT-D
           pppp                 Plan number
             tt                 Regroup type
               kkk              Group knob setting
                 —              Undefined
                 gggggggggggg   Group
```

Second message
Regroup type definition:

00 ----> Forced select, no deselect

01 ----> Forced select, optional deselect

10 ----> Undefined

11 ----> Optional select

PURPOSE

This dynamic regroup message specifies the new group into which the unit is being regrouped. The fff field specifies the number of fleet bits used in this particular agency (to allow the radio to continue fleet call decoding during the regroup). The group knob setting field specifies the dynamic regroup knob position within the radio to be used (000 indicates position 01, ..., 111 indicates position 08). These bits (along with the type bits) are echoed in the inbound acknowledgement. The pppp field specifies a dynamic regroup plan number. See the outbound control channel PBM (Plan Bit Map) message for explanation of the use of plan numbers.

This message is sent in "phase I" on an alternate control channel and in "phase II" periodically as a background task of the control channel. In failsoft or before the site controller informs the control channel trunking card of plan status, all bits will be set.

CANCEL DYNAMIC REGROUP

```
FORMAT: 27 . . . . . . . . . . . . . . . . . . . . 0
       111                      MT-A
         111                    MT-B
           00000                MT-D
             kkk                Group knob setting
               1111111111111    Logical ID
```

PURPOSE

To cancel the dynamic regrouping function performed on a radio. The group knob setting field specifies the dynamic regroup position being canceled. These bits must be echoed in the acknowledgement in the preferred embodiment.

SYSTEM DYNAMIC REGROUP PLAN BIT MAP

```
FORMAT: 27 . . . . . . . . . . . . . . . . . . . . 0
       111                      MT-A
         111                    MT-B
           00100                MT-D
             b                  Plan bank
               r r r r r r r r  Plan residency
               a a a a a a a a  Plan activation
``` b=Plan bank bit. A "0" here means plans 0 through 7 are described in the residence and activation fields. A "1" here means plans 8 through 15 are described in the residence and activation fields.

rrrrrrrr=Plan residency bits. The first bit in this field (MSB) is plan 7 (15 if b is set). The last bit (LSB) is plan 0 (9 if b is set). A "1" in the plan's residence bit informs mobiles that the plan is resident on the system.

aaaaaaaa=Plan activation bits. First bit (MSB) is plan 7 (15 if b is set). Last bit (LSB) is plan 0 (8 if b is set). A "1" in the plan's activation bit informs mobiles that the plan is active on the system.

PURPOSE

To notify all units of resident and active dynamic regroup plans.

Plans are numbered from 0 to 15, divided into two banks of 0-7 and 8-15. In the preferred embodiment, a mobile or portable unit can only participate in one plan at a time, and can hold at most 8 dynamic regroups from that plan. The plan number is passed to the units in the dynamic regroup messaging. A resident plan is one which has been (or is being) downloaded to the mobile and portable units. The plan is not available for user access at this point, but is retained by the units. An active plan is one which is available for user access. Active plans must first be made resident. Any unit which has loaded regroups from a given plan will automatically remove them from memory if the resident bit for that plan is 0 in this message. No acknowledgement is sent to the site when this occurs.

DATA STRUCTURES MAINTAINED BY SITE CONTROLLER 410

Below is a brief discussion of the implementation and functionality of the major data structures used by site controller 410 in the preferred embodiment to implement dynamic regrouping. These data structures are updated periodically by system manager 416 in a manner that will be explained shortly.

Two data structures are maintained by site controller 410 to keep track of and control the dynamic regroup process: a queue 1400, and a "regroup control buffer" 1420. The queue 1400 maintains information about individual transceivers 150 involved in the regrouping process, while buffer 1420 stores status information about regroups.

The primary data storage area for the dynamic regrouping task is the queue data structure 1400 shown in FIG. 5. Queue 1400 consists of an array of 1024 queue elements 1402(0)-1402(n) in the preferred embodiment — each element relating to a specific individual transceiver to be regrouped. Each queue element 1402 contains a logical/unit id field 1404, a home (source) group id field 1406, a field 1408 pointing to the next element in the same regroup (or a "−1" for the last element for the regroup in the queue), a status field 1410, and a unit control block 1412. Status field 1.410 is used in the preferred embodiment to identify those units that have responded to the regroup command.

The unit control block field 1412 contained in each queue element 1402 identifies the type regroup request for that particular unit, the unit's acknowledgement flags, and the unit's group knob setting. The diagram below shows an exemplary format for the unit control block 1412 in the preferred embodiment:

| B15 | B12 | B10 B9 | B8 B7 | B6 | B3 B2 B1 | B0 |
|-----|-----|--------|-------|-----|----------|-----|
| A | Unused | B | C | D | E | F | Unused |

| | |
|---|---|
| B15 through B13 | (A) group knob setting |
| B12 through B10 | unused |
| B9 through B8 | (B) type request |
| 00 ----> | forced select, no deselect |
| 01 ----> | forced select, option deselect |
| 10 ----> | undefined |
| 11 ----> | option select |
| B7 | (C) active pending |
| B6 | (D) active |
| B5 | (E) cancel pending |
| B4 | (F) cancelled |
| B3 through B0 | unused |

When a mobile responds to a regroup command, the "active pending" bit in the corresponding unit control block record 1412 must be cleared. Unfortunately, in the preferred embodiment the only identifiable means finding the queue element is through the logical id. However, in the preferred embodiment, records 1402 of queue 1400 are not sorted by logical id field 1404, and although indexed by pointer 1408 for associated regroup, may be scattered throughout the queue in any order. To search the queue by logical ID field would be very inefficient without some higher level search algorithm. In the preferred embodiment, a sort control block is maintained which provides an array of pointers. These pointers point "into" the queue 1400, and index the queue records 1402 by sorted logical identification field 1404.

A queue control block, a further data structure used to implement dynamic regrouping in the preferred embodiment, is a simple structure that maintains information regarding queue space used, queue spaced allocated and a pointer to the free list. This queue control block permits the system to manage the queue 1400. An exemplary format for the queue control block is shown below:

| Total Used | Total Allocated | Free Pointer | RCB Cnt | Service |
|------------|-----------------|--------------|---------|---------|
| | | | | |

Another data structure used in the preferred embodiment to implement dynamic regrouping is the regroup control block 1420 schematically shown in FIG. 6. A regroup control block 1420 is created for each active or resident regroup plan on the system. The regroup control block 1420 includes a record 1422 corresponding to each regroup (destination group) in a particular regroup plan. Each record 1422 contains information about the dynamic regroup process, including: the destination group id field 1424 (primary identifier of each regroup process); a field 1426 pointing to the first unit in the regroup; a field 1428 pointing to the last unit in the process; a field 1430 containing the current number of elements available (allocated — currently used); a counter 1432 containing the number of times to retry the regroup before reporting the status to the system manager; the current retry count 1434; a status field 1436; and an "acknowledge pending" bit 1438.

FIG. 7 is a detailed schematic diagram of an exemplary status field 1436, this field containing an active/inactive field 1436(a) and a fleet decode field 1436b. The following describes the significance of fields 1436a,b:

Active/inactive field 1436a:
  0 → regroup is not currently active
  1 → active regroup
Fleet decode field 1436b:
  Contains fleet number decoding information Site controller 410 data structures handle dynamic regroup information on the regroup level rather than on the plan level. It is the responsibility of system manager 416 to manage regrouping processes in the preferred embodiment to permit activation of entire regroup plans.

Figure 8:
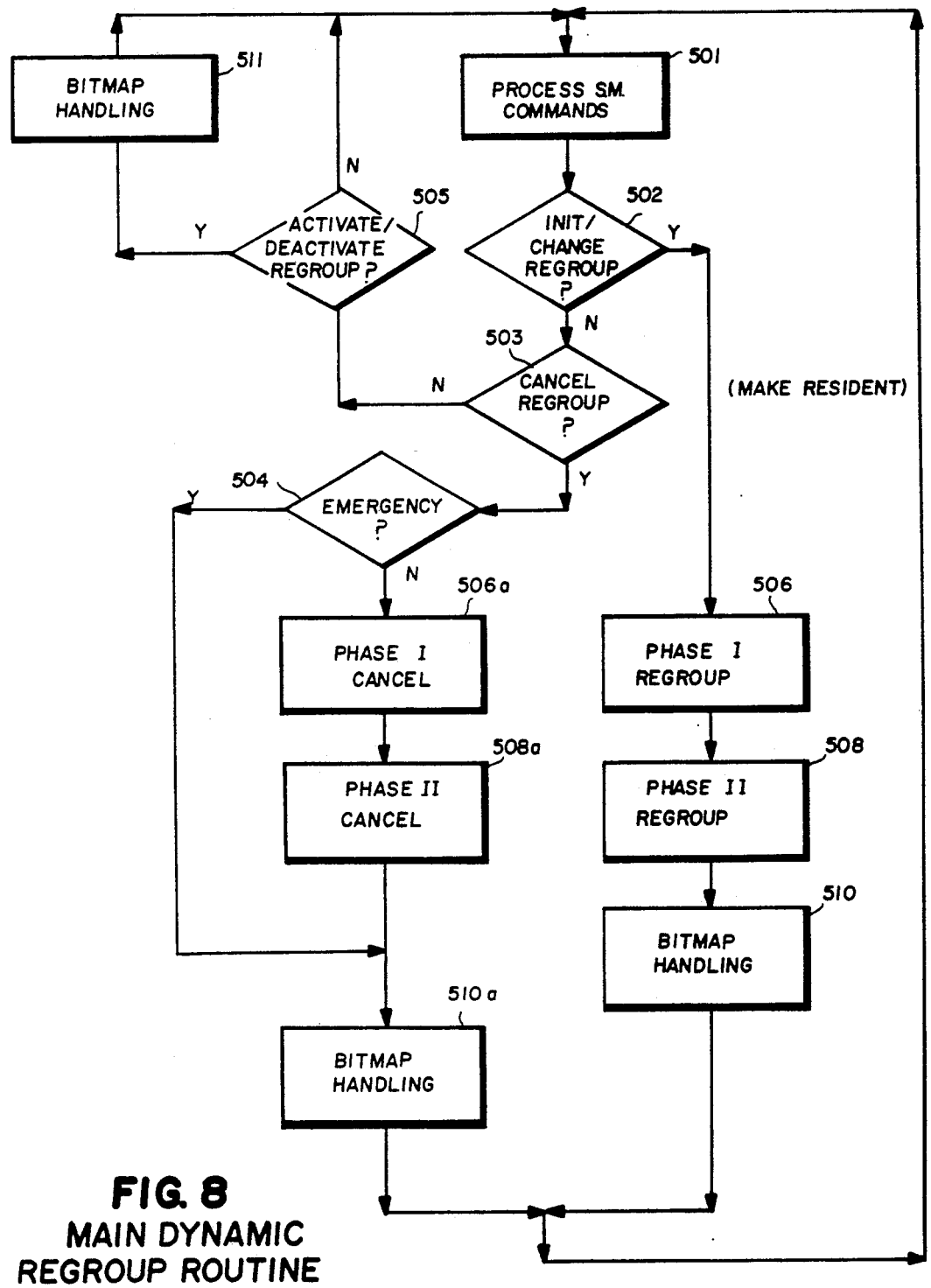

FIG. 8 is a flowchart of exemplary program control steps performed by system 100 to manage dynamic regrouping; FIGS. 9, 11 and 12 are flowcharts of exemplary program control steps performed by site controller 410 in the preferred embodiment to implement the dynamic regrouping function; and FIGS. 10, 13, and 14 are flowcharts of exemplary program control steps performed by mobile radio transceiver 150 for implementing dynamic regrouping in the preferred embodiment. These FIGS. 8-14 will be discussed together in order to describe the overall steps performed by system 100.

All dynamic regrouping commands originate at system manager 416 in the preferred embodiment. System 100 processes these commands (FIG. 8 block 501) by first decoding them to determine whether they are commands to make a regroup resident or change a resident regroup (decision block 502); command to cancel a regroup (decision block 503); or commands to activate/deactivate a resident regroup (decision block 505).

If the inputted command requires a new regroup to be made resident on system 100 (block 502), system manager 416 sends messages to site controller 410 requiring it to initiate the regrouping process (in the preferred embodiment, this command is actually carried out by first updating site controller data structures 1400, 1420 with information needed to begin the regrouping process, and then sending the site controller a "start regroup" request, as will be explained). The site controller 410 performs the regrouping process (block 506); the "phase II" regrouping process (block 508); and a "bitmap handling" process (block 510). All three processes are typically performed simultaneously by site controller 410 in the preferred embodiment.

Referring now to FIG. 9 (the detailed flow chart of the "phase I" regroup process 506), site controller 410 in effect breaks down regroup requests by source groups from which the individual transceivers to be regrouped reside — as specified in the "home group ID" fields 1406 within queue elements 1402. That is, for "phase I" processing, controller 410 first contacts entire "source groups" of transceivers — some of the member transceivers of which may not be involved in the regrouping process, and then exchanges signals on a transceiver-by-transceiver basis with each transceiver to be regrouped. In the preferred embodiment, the "phase I" regroup process proceeds by calling all source groups (that is, groups normally resident on the communications system) from which individual transceivers are taken to form the new regroup and causing these source groups to monitor an alternate control channel temporarily; and then sending regroup messages (and receiving responses) over the alternate control channel to each individual transceiver to be in the new regroup.

Site controller 410 first determines whether any more source groups need to be contacted in order to form the new regroup (FIG. 9 decision block 514). Site controller 410 selects the "next" source group in the planned new regroup (block 516) and determines whether there are more than "x" (x=3 in the preferred embodiment) units in this source group (decision block 518). If more than x units are in the new regroup, site controller 410 executes the "phase I" regrouping process (FIG. 8 block 506, FIG. 9 blocks 520-530) involving an alternate control channel. On the other hand, messages to only "x" or fewer mobiles will not impose burdensome loading on the main control channel and may not justify the additional overhead required to perform "phase I" processing — and therefore, in the preferred embodiment, only the "phase II" (background) regrouping process is used for such small regroups (FIG. 8 block 508 and FIG. 12 blocks 532-538).

It should be noted that there are advantages to specifying large source groups. First, it is easier for the supervisor to build regrouping plans and visualize the plans when they are executed. Second, the regrouping process is not only faster but also more efficient if larger numbers of units to be regrouped can be handled simultaneously by the "phase I" portion of the process. In addition, there is a very subtle but important third advantage addressing the fact that regroup plans can't be independent of "shift" — that is, periods during the day and night when different personnel are working. Unfortunately, the world is not blessed with accidents that wait until the shift personnel stored in a particular plan are on duty. An emergency dynamic regroup plan must therefore be independent of shift. Achieving shift independence can be difficult if not impossible to achieve in practice, but the regrouping provided by the present invention can relieve the problem to some extent. Since the regrouping process can occur so quickly, any plan can include radios from multiple shifts. Within a short time of execution of the plan, the operator of system manager 416 can determine which radios have been regrouped and which radios are not present. Radios that have not responded to regroup messages (most likely because they are "off duty") can be interactively removed from the regroup plan.

If there are more than "x" units in the source group, "phase I" regrouping can proceed for that source group, and a channel assignment for the source group is transmitted over the main control channel — this channel assignment message specifying a free working channel (block 520). All mobile transceivers in the specified source group monitoring the main control channel respond to the group channel assignment message in the same way they respond to any routine group channel assignment message in the RF signalling protocol of system 100 — except that in this case site controller brings up the free channel as an alternate control channel instead of as a working channel (FIG. 9, block 520). Site controller 410 merely controls the working channel trunking card (e.g., 402) associated with the free working channel to behave as a control channel trunking card rather than as a working channel trunking card (in the preferred embodiment, any trunking card can cause its associated repeater to act as the control channel repeater for "fail-soft" considerations — this feature of the system architecture is used to advantage in the phase I dynamic regroup process by simply reconfiguring a free working channel as an alternate control channel).

The alternate control channel activated by block 512 has all of the same signalling as the main system control channel — except that a certain bit sequence in periodically-transmitted control channel protocol is modified slightly on the alternate control channel so that mobile units can distinguish between an alternate control channel and the "real" control channel. Suppose, for example, that a mobile transceiver enters the geographical area served by a site (or is turned on) while an alternate control channel is activated, begins searching for the control channel and comes across the alternate control channel before it discovers the "real" control channel. In this situation, the mobile transceiver detects that even though the control channel it is monitoring "looks" like a control channel, the bit sequence corresponding to dynamic regrouping is present, and therefore the mobile transceiver continues scanning until it finds the main control channel.

Referring briefly to FIG. 10, mobile transceivers in the called source group respond to the channel assignment message issued by site controller 410 over the main control channel in the same way they respond to any routine group channel assignment message — by loading their internal frequency synthesizer with the appropriate frequency (block 704) — thereby retuning to the alternate control channel. The called source group transceivers then obtain synchronization with the "slotted" outgoing digital control channel signals site controller 410 causes to have transmitted over the alternate control channel (block 706) and decodes each outgoing alternate control channel message as it is transmitted (block 708). Meanwhile, after site controller 410 "collects" the source group containing transceivers to be regrouped onto the alternate control channel, it makes up to three attempts to contact each individual mobile transceiver to actually be regrouped.

It is an important feature of one aspect of the present invention that FIG. 9 block 520 causes all transceivers in a specific source group (even those that will not be dynamically regrouped) to begin monitoring an alternate control channel. Typically, only some and not all of the transceivers in a particular source group will actually be sent a dynamic regroup command by block 530. However, because of the rapid data transfer rate over the alternate control channel (which in the preferred embodiment carries no messages not needed for either the dynamic regroup process or for sustaining synchronization between the site and the mobile units in the source groups), dynamic regroup messages can be transmitted very rapidly over the alternate control channel — and because there are no contentions on the inbound control channel, transceivers can send acknowledgments just as rapidly. Using this technique, over thirty mobile transceivers per second can be "regrouped" via the "phase I" process 506 in the preferred embodiment — and thus, mobile transceivers not actually being regrouped but which are members of source group containing mobile units which are being regrouped are only taken away for normal communications for an instant (not long enough to interfere with any routine calls they might receive).

FIG. 9 decision block 522 tests whether three passes have been completed for each mobile transceiver to be regrouped. If three passes have not been completed for each transceiver, site controller 410 next determines whether all units to be regrouped from the source group have been processed (FIG. 9 decision block 524). If some units have not yet been "regrouped", then site controller 410 selects the next individual unit from the source group to be "processed" (block 526), and tests whether this unit has already sent an acknowledgement message over the alternate control channel (signifying that it has already received and processed the dynamic regroup message — as recorded by a bit in the unit control block field 1412 of associated queue element 1402) (block 528).

If the selected unit has not yet sent an acknowledgement, site controller 410 transmits a dynamic regroup outbound control channel message over the alternate control channel directed to that specific unit (block 530). The format of this outbound control channel dynamic regroup message was set forth previously, and includes a first message specifying the logical identification of the individual transceiver being regrouped and a second message specifying various parameters of the new regroup (e.g., regroup plan number, regroup type, group knob setting and identification of the regroup). Each mobile transceiver 150 is equipped with sufficient internal non-volatile memory space to store up to 8 regroups at a time (in the preferred embodiment all 8 regroups must be part of the same regroup plan).

Referring now again to FIG. 10 (a flow chart of exemplary program control steps performed by mobile transceivers 150 in the preferred embodiment to implement dynamic regrouping), when a mobile unit decodes a dynamic regroup command transmitted by FIG. 9 block 530 that specifies its own individual identification (FIG. 10 decision block 710), the transceiver stores the regroup information contained in the dynamic regroup message into an internal non-volatile memory (FIG. 10 block 712) and transmits a standard protocol acknowledgement message to the site (this acknowledgement message echoing the regroup parameters fields contained in the second message in the outbound control channel dynamic regroup message pair) (block 714). Site controller 410 awaits receipt of acknowledgement messages transmitted by block 714 (FIG. 11 block 801). When an acknowledgement message is received, site controller 410 finds the appropriate queue element 1402 shown in FIG. 5 corresponding to the specific mobile transceiver which has sent the acknowledgement (e.g., by locating the correct logical id field 1404 through a sort control block used to index the queue) (FIG. 11 block 802), changes the Unit Control Block bit 1412 in the appropriate queue element to reflect that the unit has responded to the regroup command (block 804), and returns to what it was previously doing (FIG. 11 blocks 801, 802, 804 may be performed on an "interrupt-driven" basis if desired).

All mobile transceivers in the source group continue to monitor the alternate control channel until site controller 410 causes a termination message to be transmitted over the alternate control channel (FIG. 9, block 532). In the preferred embodiment, this termination message is simply the standard "site id" message with the site id set to a specific value not used by any existing site in system 100 (e.g., Site ID=63). Hence, mobile units in the source group that are not being regrouped and mobile units that have already received a dynamic regroup message directed to them and acknowledged the message continue to monitor the alternate control channel in the preferred embodiment until a "site id" type termination message is transmitted by the site controller (FIG. 9, block 532) and received by the mobiles (FIG. 10, decision blocks 716, 718), at which time the mobiles return to the main control channel (FIG. 10 block 720) and monitor the main control channel in normal fashion to await receipt of call messages specifying either their "normal" groups (or a "regroup activation" bit map message if they have been reconfigured by block 712).

Referring once again to FIG. 9, blocks 522-530 are performed three times in the preferred embodiment for each mobile transceiver to be regrouped. That is, each transceiver to be reconfigured into the new regroup is sent an outbound control channel dynamic regroup message, after which site controller 410 waits briefly for an acknowledgement. If no acknowledgement is received within a certain time-out period, site controller 410 sends the mobile transceiver another outbound control channel dynamic regroup message and waits for an acknowledgement. If no acknowledgement is sent to the second message, the site controller 410 transmits a third dynamic regroup message to the mobile unit and waits for an acknowledgement. If no acknowledgement is received in response to this third dynamic regroup message, site controller 410 "gives up" attempting to dynamically regroup that specific mobile transceiver in the "phase I" process. Site controller 410 then releases the source group and the alternate control channel (e.g., by transmitting a terminate message as described, although it might also be possible to release the source group by transmitting a working channel assignment message specifying the main control channel if desired, or alternately, by simply "dropping" the alternate control channel and thereby causing the mobile transceivers to scan for the main control channel), and repeats block 514-530 for the next source group containing mobile units to be placed into the new regroup. Site controller 410 is capable of concurrently performing the "phase I" process 506. That is, multiple alternate control channels can be established simultaneously, and process 506 can be performed for different regroups simultaneously (or for different source groups for the same regroup simultaneously) using different alternate control channels if desired.

When each such source group has been processed (as tested for by decision block 514), the "phase I" process has been completed, site controller 410 begins performing "normal" tasks (including "phase II" dynamic regrouping in the "background" over the main control channel) for that group. This can occur simultaneously with Phase I of the next source group.

Even after the "phase I" regroup process has completed, there may still be (and typically are) a few mobile transceivers that for various reasons have not yet been "regrouped". For example, FIG. 9 block 518 specifically avoids regrouping certain mobiles in "phase I"; and some mobile transceivers may not have been powered-on during the "phase I" regrouping process, while others may have been obstructed by a hill or a bridge from receiving "phase I" regroup messages intended for it. Even though redundancy is "built in" to the RF signalling protocol being used (e.g., after the channel assignment message is transmitted by FIG. 9 block 520 over the main control channel, it may be periodically retransmitted via subaudible signalling on the working channels and is repeated periodically over the main control channel to reach mobile transceivers that may have "missed" the first channel assignment message to permit "late entry"), some mobile transceivers that need to be regrouped may not be regrouped by the "phase I" regroup signalling transaction. "Phase II" regroup signalling over the main control channel is used to reach: (1) mobiles that are called to the alternate control channel but fail to respond and/or acknowledge regroup messages transmitted to them; (2) mobiles from source groups containing fewer than a specified number of mobile transceivers needing to be regrouped; and (3) mobiles that were turned off or out of range for phase I.

FIG. 12 is a flow chart of exemplary program control steps performed by site controller 410 to implement the "phase II" dynamic regroup signalling process, and FIG. 13 is a flow chart of exemplary program control steps performed in the preferred embodiment by mobile transceivers 150 in response to "phase II" dynamic regrouping signalling.

Referring now particularly now to FIG. 12, site controller 410 (which is typically engaged in transmitting various different messages over the main control channel, including routine periodically-transmitted status messages and channel assignment messages for routine group and individual calls) determine whether any mobile units need to be regrouped using "phase II" signalling (this information may be obtained by searching through the queue 1400 for unresolved regroup requests (FIG. 12 decision block 533). If there are mobile units to regroup using "phase II" signalling, the "next" unit is selected (block 534) and the queue element 1402 corresponding to that unit is tested to determine whether the unit has already acknowledged a dynamic regroup message directed to it (decision block 536). If the unit has not yet acknowledged, a dynamic regroup outbound control channel message transmitted over the main control channel directed to the unit to be regrouped (block 538). In the preferred embodiment, this outbound control channel dynamic regroup message is identical to messages transmitted over the alternate control channel by FIG. 9 block 530 — and mobile transceivers respond in the same manner as the transceivers do on the alternate control channel (see FIG. 10) by insuring the dynamic regroup message is intended for them, storing the regroup parameters in their internal memories, and transmitting acknowledgements to the site (FIG. 13, blocks 710a-714a). In the preferred embodiment, phase II signalling is performed indefinitely for all mobiles to be regrouped that do not respond (typically a relatively small number) until system manager 416 cancels the regroup requests as to those mobile transceivers.

The "phase II" process taking place on the main control channel adjusts the number of outbound dynamic regroup control channel messages based on system loading. If loading is light, there is no reason why several regrouping commands per second can't be issued. A system loading increases, the rate at which dynamic regroup control channel messages transmitted over the main control channel is decreased to avoid adverse impact on other system operations.

In accordance with an important feature of a further aspect of the invention, mobile transceivers "regrouped" as discussed above (that is, dynamically reconfigured during the "phase I" and "phase II" signaling processes) do not begin using the regroups dynamically allocated to them until they receive a further message to do so over the main control channel. Only upon the transmission of a regroup plan bit map message specifying activation of a particular plan previously made "resident" do all previously programmed transceivers in a particular regroup virtually instantaneously respond — all at essentially the same time — by activating the newly activated dynamic regroup. Immature groups are entirely avoided using this virtually instantaneous activation technique. In addition, even though it is desirable to transmit outbound control channel cancel dynamic regroup messages to individual transceivers and receive responsive positive acknowledgements in order to cancel (make non-resident) a resident dynamic regroup plan, it is possible in an emergency (or panic situation) to make a resident (active or inactive) regroup plan immediately inactive and non-resident by issuing a single outbound control channel bit map message specifying that the plan is non-resident.

Referring now to FIG. 8 block 510, around the time "phase I" signaling is occurring, site controller 410 performs a bit mask handling routine that issues updated bit map outbound control messages over the main control channel. As discussed previously, the system dynamic regroup plan bit map periodically transmitted over the main control channel notifies all mobile units on communications system 100 of the current status (resident and/or active) of up to sixteen different regroup plans. As soon as "phase I" signaling process 506 is performed for any (the first) regroup in a regroup "plan" (each plan may contain an arbitrary number of regroups in the preferred embodiment), site controller 410 must modify the bit plan map periodically transmitted over the main control channel to reflect that the new regroup plan has been made "resident" on system 100. The site controller 410 performs this updating merely by changing the appropriate "plan residency" bit in the regroup plan bit map to reflect that a new regroup plan has been made resident on system 100 — and transmitting the updated bit map in a message over the outbound (main) control channel. When a mobile transceiver receives an outbound control channel regroup plan bit map message over the main control channel (block 716 of FIG. 14), it decodes the message and, if it stores any regroup plan parameters in its internal memory, it tests the plan residency bit(s) corresponding to the internal regroup plans it stores. If the resident bit in the received bit map corresponding to a particular plan stored in the internal memory is not set, the mobile transceiver autonomously purges the area of its internal memory storaging dynamic regroup parameters (decision block 718, block 720 of FIG. 14) — this purging process being relatively simple in the preferred embodiment because of the restraint that only one regroup plan can be resident in a given mobile at a given time. On the other hand, if the residency bit corresponding to an internally stored dynamic regroup plan is set (indicating that the plan is still or has become resident on system 100), the mobile transceiver retains the plan parameters in memory (block 722).

Mobile transceivers 150 also test the plan bit map to determine whether they should activate resident dynamic regroup plans. In accordance with an important feature of one aspect of the present invention, dynamic regroups may be "resident" but not yet "active". Referring briefly to FIG. 8, if system manager 416 commands that a formerly inactive resident, regroup plan is to made active (decision) block 505), site controller 410 transmits an updated bit map message over the main control channel with both the residency" and "active" bits for that regroup plan being set (block 511). When a mobile transceiver receives a plan bit map that specifies a particular plan (parameters of which are stored in its internal memory) as being both "resident" and "active", the transceiver activates the regroup plan (e.g., by responding to all channel assignment message calls issued on the main control channel corresponding to the regroup or regroups in the plan, by permitting the user to access the regroups in the plan that knob control settings specified by the regroup parameters, and in some cases, by forcing the transceiver to operate only on the regroup as specified by the "regroup type definition" issued as part of the dynamic regroup outbound control channel message making the regroup plan "resident") (decision block 724, block 726 of FIG. 14).

Similarly, site controller 410 can make a previously active regroup plan inactive by simply transmitting an updated bit map with the status bits corresponding to the regroup plan set to "resident" but "inactive". If a previously "active" regroup plan is deactivated, receiving mobile transceivers simply discontinue using the regroup plan parameters (e.g., by preventing the user from accessing the regroups via the group select knob, and by ignoring group call messages directed to the regroups) (FIG. 14, decision block 724, block 728). Significantly, the deactivated "plan" remains "resident" in the transceiver until the transceiver receives a further plan bit map specifying it should be made non-resident (and/or until the transceiver receives a cancel regroup command as will be explained) — so that multiple (and even alternate) regroup plans can be "resident" on system 100 simultaneously and system manager 416 can activate or deactivate regroup plans at will without the time delay involved in sending each individual transceiver to be regrouped new parameters.

Referring to FIG. 8 once again, canceling a resident dynamic regroup plan can be performed in either of two ways. If a resident plan is to be canceled (decision block 503), the system manager 416 can specify a non-emergency (more ordered) cancellation (decision block 504, blocks 506a-510a) or an emergency (decision block 504, block 510a) cancellation. In the non-emergency cancellation, the "phase I" and "phase II" steps shown in FIGS. 9-14 are performed just as for making a new plan resident — except that the channel assignment messages transmitted by block 520, FIG. 9 may be directed to the regroups instead of to the source groups (if the plan being canceled is still active at time of cancellation) — and FIG. 9 block 530 and FIG. 12 block 538 transmit cancel regroup messages rather than dynamic regroup messages to individual transceivers. This non-emergency cancellation technique assures a positive acknowledgement from each mobile transceiver in response a cancel regroup message directed specifically to it (in response to which cancel regroup message the mobile transceiver erases the appropriate plan parameters from its internal memory rather than adding them as in FIG. 10 block 712, FIG. 13 block 712a). The "emergency" type cancellation uses an updated bit map message to control all transceivers in which a particular plan is "resident" to purge the dynamic regroup information from their internal memories.

In the event of a "fail soft " situation (see commonly assigned application Ser. No. 057,046 filed Jun. 3, 1987), the control channel trunking card sets a bit in the outbound control channel protocol to indicate that system 100 is in fail soft mode. Upon detection of this bit, all transceivers 150 in which a regroup plan is "resident" and "active" automatically override the dynamic regroup "regroup type" parameter transmitted as part of the dynamic regroup message making the plan resident — and set this parameter to "11" (optional select). In other words, all active regroups revert to a mode which allows users to optionally switch into and out of them whenever the system enters the "fail soft" mode. Meanwhile, the control channel trunking card is capable of handling calls to and from regrouped transceivers as well as "normal" transceiver groups when operating in fail soft mode — and is also capable of handling console commands to cancel regroup plans and transmit bit map messages making active plans non-resident. An acceptable mode of operation is thus provided even if site controller 410 fails at the time a regroup plan is only partially implemented.

SYSTEM MANAGER 416

System manager 416 plays an important role in controlling system 100 and is the portion of the communication system in the preferred embodiment which directs dynamic regrouping functions. System manager 416 also handles all of the alarm and control functions provided by ACU 600, and also receives notification of alarm and other error conditions generated by test unit 700 and power monitor unit 500. System manager 416 in the preferred embodiment is intended to be operated by the system manager operators — people who are responsible for the overall operation and maintenance of system 100.

Figure 4:
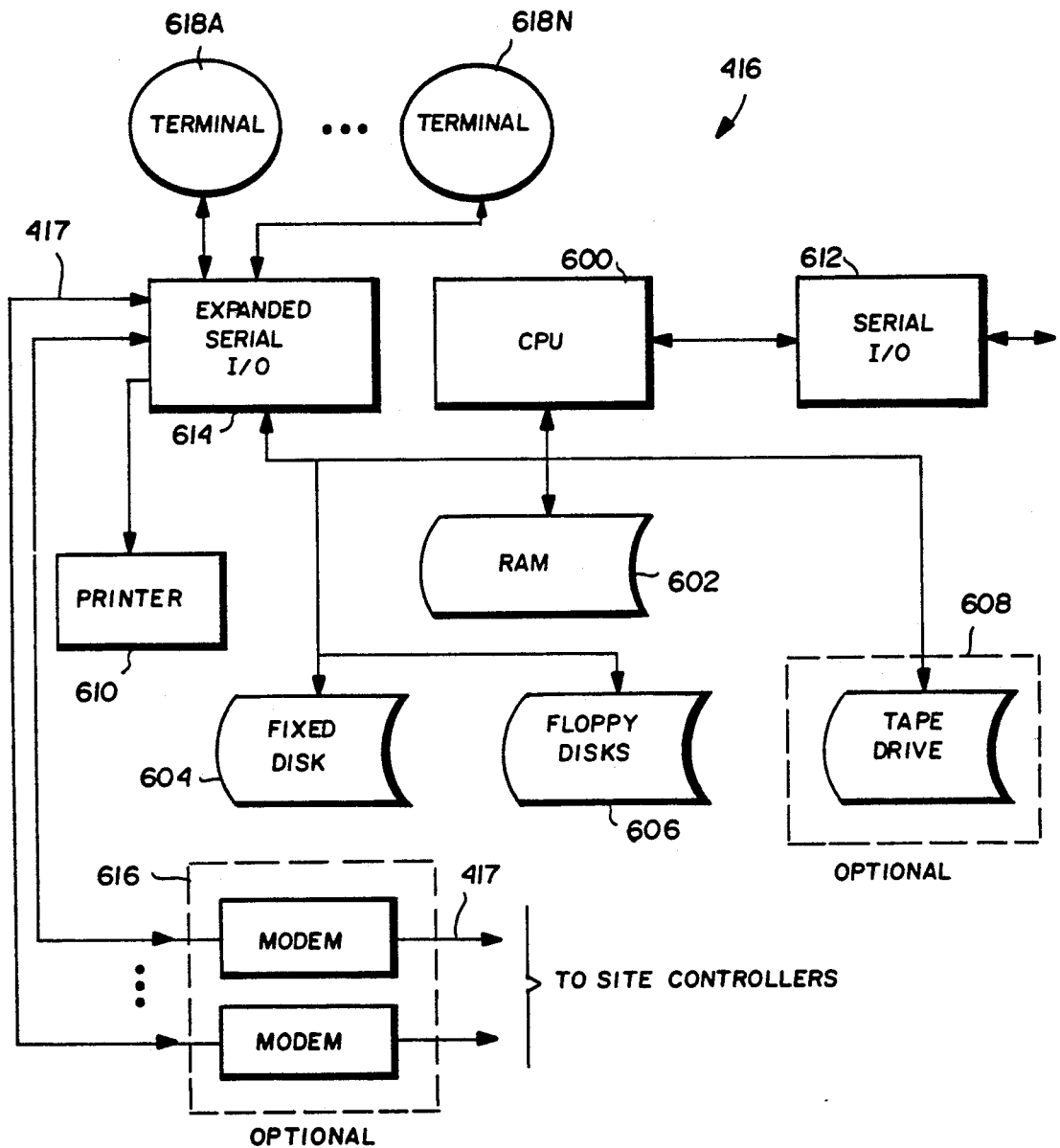
FIG. 4 is a detailed schematic block diagram of the system manager 416 shown in FIGS. 2 and 3.

FIG. 4 is a detailed schematic diagram of the structure of system manager 416. System manager 416 includes a central processing unit 600, a random access memory 602, a fixed disk 604, floppy disk drives 606, an optional tape drive 608, a printer 1610, a serial I/0 interface 1612, an expanded serial I/0 interface 614, serial modems 616, and one or more display terminals 618. Central processing unit 600 may be any desired conventional general purpose digital computer in the preferred embodiment (e.g., an IBM PC) connected to which is random access memory device 602, serial I/0 interface 1612, 614, tape drive 608, fixed disk 604 and floppy disk drive 606. In the preferred embodiment, site controller 410 includes no hard disk drive, so that one of the responsibilities of system manager 416 is to store system parameters on fixed disk 604 and download those parameters to site controller 410 upon power-up of system 100.

CPU 600 communicates simultaneously with one or more display terminals 618 (each including the CRT display and a keyboard) via expanded serial I/0 interface 614 (of conventional design). Printer 610 is provided to permit printing of a running log (or other desired reports) of system events. CPU 600 communicates with site controller 410 via a serial data link 417 (and communicates with a backup site controller via an additional serial data link). System manager 416 in the preferred embodiment is capable of managing plural sites simultaneously, and thus may be in contact simultaneously with several repeater sites. Modems 616 (of conventional design) may be provided to allow communication between the site controller 410 and system manager 416 over a conventional landline.

Some of the functions performed by system manager 416 in the preferred embodiment include:
Dynamic Regroup Group and Plan Assignments;
Dynamic Regroup Activation;
Dynamic Regroup Deactivation; and
Dynamic Regroup Site Coordination.

THE DYNAMIC REGROUP SYSTEM MANAGER USER INTERFACE

As mentioned, the dynamic regroup interface in the preferred embodiment is used to plan in advance for situations that require units from various home groups be temporarily configured to a group(s) other than their home group. The configurations are then saved in destination group(s) under a plan name and can later be activated with a minimum number of keystrokes. A supervisor is able to activate from the plan level (which activates all destination groups under the plan) or from the destination group level (which only activates a single destination group at a time). The dynamic regroup function in the preferred embodiment provides:
an unlimited number of plans up to disk storage capacity
each plan can have many destination groups
each destination group can identify many source groups from which the units are selected It is important for the dynamic regroup user interface to be easy to use and easy to understand. The preferred embodiment user interface uses menu driven software to present information to the user in an easily understandable and digestible format and to allow the user to simply and easily specify desired group configuration information.

In the preferred embodiment, the user interface consists of three "screens" or menus: the "main" screen; the "units" screen; and the "group" screen. The data is entered via the keyboard of one of terminals 618, and the various menus are displayed via the CRT of the terminal 618. Moving between screens as well as other operations can be specified via the function keys of the keyboard in the preferred embodiment.

An exemplary "main" screen format is shown below:

```
                      GE 16-PLUS TRUNKING SYSTEM
                        Dynamic Regroup Plan Directory Plan: _____    Destination: _____    Source: _____
  Description: _____
              _____
```

| Plans | Destination Groups | Source Groups |
|---|---|---|
| | | |

| F6 | F7 | F8 | F12 | F14 | DO | F17 | F18 | |
|---|---|---|---|---|---|---|---|---|
| EXIT | SAVE | DELETE | MODPCT | GRPSCREEN | SUBMIT | STOP | RESTART | REMOVE |

The main screen consists of three "regions": the "plan" region, the "destination" group region, and the "source" group region. The "plan" region lists predefined dynamic regrouping plans available for execution. Each regroup plan specifies at least one (and typically more than one) new group in terms of the "normal" groups the mobile transceivers to be regrouped normally reside in (i.e., the "source" groups) and the new groups these mobiles are to be dynamically regrouped into (i.e., the "destination" groups, or "regroups"). In somewhat more detail, each plan consists of at least one destination group and at least one source group (each group can be a subfleet, a fleet or an agency). A "destination" group defines a new group into which radio transceivers are being dynamically regrouped (that is, a "regroup"). A "source" group is a group from which the mobile transceivers are being taken (i.e., a group in which the mobile transceivers "normally" reside). This concept of specifying dynamic regroups in terms of regroup plans each specifying a set of existing groups and new groups allows the user creating, activating or reviewing a regroup plan to keep an overall perspective (by maintaining a "top-down" approach, the user doesn't get lost in detail).

When the user selects a specific plan from the plan region of the main menu, a list of the destination groups in the plan appears in the destination region. If the user then selects one of the listed destination groups, the source groups used to "build" that destination group are listed in the source group region of the menu. By then selecting a specific source group from the list, the "units" screen appearing below is displayed:

group and dynamically regrouped into the destination group.

If a new source group is selected on the main screen (e.g., when a plan is being created or modified), all of the units associated with the selected source group are listed on the units screen — and the operator can then select which units he desires to include in the destination group. Once the operator completes his selection of desired units, system manager 416 automatically purges unselected group already specified in a plan is displayed, the units included in this displayed source group are listed in alphabetical order). New units can be added or existing units easily deleted using this same unit screen.

Specifying individual mobile transceivers in terms of the source group they are normally included within reduces the level of user complexity and permits the user to specify dynamic regroup plans in a natural manner — and also has an impact on the way dynamic regrouping is activated.

Some of the function keys displayed at the bottom of the units screen can be used to toggle the "K" field between "K" (knob setting), "T" (type of regroup), and "S" (status). Since some radios need to be programmed with multiple new groups, the ability to specify the group's knob setting eliminates ambiguity or conflicts. In the preferred embodiment, new groups specified using the dynamic regrouping feature do not replace existing groups in a radio transceiver, but rather are positioned "below" them on the transceiver channel selection knob/display. Suppose, for example, that a mobile radio transceiver is set to group "1". If the trans- Page 1 of 1　　　　GE 16-PLUS TRUNKING SYSTEM
　　　　　　　　　　Dynamic Regroup Units　　　　　　Current Mode: CREATE Regroup Plan: _____　　　　　　　　　　Units from Source Group: _____
Destination Group: _____　　　　　　　　Group Level: _____

Description: _____
_____

| Unit | K | Unit | K | Unit | K | Unit | K | Unit | K | Unit | K |
|---|---|---|---|---|---|---|---|---|---|---|---|
| | | | | | | | | | | | |

Percentage Required: __　Complete: 0
Critical Unit Count: 0　Resolved: 0

| F6 | F7 | F9 | F10 | F11 | F12 | F14 | F17 | F18 | F19 | F20 |
|---|---|---|---|---|---|---|---|---|---|---|
| EXIT | SAVE | NXTGRP | NEWPG | MODCRIT | CRITICAL | SELALL | STATUS | KNOB/SEL | PURGE | MORE |

The "units" screen lists all of the units in the specified source group that are to be extracted from the source ceiver user selects the next "higher" group by clicking his channel selection knob one position to the right, the transceiver will begin operating in the next higher "normal" group. If, on the other hand, the transceiver user selects a "lower" (i.e., left-hand position) group, the transceiver will begin operating on the "highest" regroup programmed into the radio. Turning the channel selection knob an additional position to the left selects the next "lower" regroup, this selection continuing until all "regroups" have been selected. Regroups are distinguished from "normal" groups on transceiver digital displays by displaying the "0" in the first digit position. For example, if a radio transceiver is programmed with "normal" groups "1", "2" and "23" and the radio is regrouped with two regroups, one with the knob setting "01" and the other with the knob setting "05", the sequence of groups as accessible from the group select control knob would be "01", "05", "1", "2" and "23" (in that order as the knob is turned from left to right in the preferred embodiment).

The "type" setting specifies whether the radio should or should not be forced to join a dynamically allocated group and whether or not the user can override the regroup command if he desires. There are four possible values for this "type" setting in the preferred embodiment:

(a) the regrouped transceivers is forced to a regroup and cannot deselect the regroup, (b) the regrouped transceiver is forced to a regroup but can deselect the regroup and use another group, (c) the regrouped transceiver can freely select and deselect the regroup; and (d) the regrouped transceiver is not forced into the regroup, but if the transceiver user selects the regroup the transceiver is forced to remain on the regrouping. The system manager user can change any of the four "type" settings on a unit-by-unit and regroup-by-regroup basis.

The "status" field is used when a regrouping plan is active to indicate whether or not a radio transceiver has actually been regrouped or whether the regroup request is pending as to it (e.g., the unit has not yet been located so it is not yet regrouped). This status field thus allows the system manager operator to interactively monitor regrouping as it progresses.

The preferred embodiment also permits the supervisor to specify not only what units will be regrouped into specific destination groups, but also the identification of the destination group. This additional information is specified by using the "group" screen shown below:

```
                GE 16-PLUS TRUNKING SYSTEM
                  Dynamic Regroup Define Screen Plan Name       : _____  Dest. Group: _____  Percent Req.: 100
Description     : _____

Agency Number   : _       Fleet Number: _    Subfleet Number: ___
Record Type     : _____
Console Name    : _____ Console Bay Number: _ Console Module: ___

(Division)      : _____
(Name)          : _____
(Street)        : _____
(City)          : _____  (State): _    (ZIP): _____
(Phone Number)  : _____
Priority        : _                              (Hang Time): _
                        11111111112222222222333
Site Number        12345678901234567890123456789012
Active (Y)      : _____

F6     F7    F10
EXIT   SAVE  CLEAR
```

By specifying the destination group and striking the "group" function key, the group screen is displayed. This group screen lists the name of the plan and the name of the destination group (regroup) and allows the user to input information identifying the regroup (e.g., agency, fleet or subfleet). The priority and hang time to be associated with a regroup may also be specified, in addition to "percent required" and "critical unit" information which permits a new group to become active only when a specified percentage of total units in the designation group and all units designated to be critical to the regroup have actually been regrouped.

The procedure for defining a regroup plan may proceed as follows:

1. Decide which units need to be included in the plan. If a number of units are in the same home group(s), record the home group name(s). These home group names are the source groups. The names of all units in the source group will be generated automatically by the system on the units screen. The user is able to edit the source group unit by unit, so it is not necessary that a home group be identical to the source group.

2. List the names of any units that are to be included in the plan that do not appear in any common home group.

3. Decide on the number of destination groups ("regroups") for the plan and give a unique destination group name (up to 8 characters) to each one. List the home group names in step 1 and the units in step 2 in order of which ones you want to be able to activate together under a destination group name.

4. If any destination group has only names from step 2 and no home group names from step 1, write the word INDIVIDL under the destination group name. INDIVIDL is the source group name for this list. When setting up the plan, you will have to type each individual unit name only for individual units that don't appear in any common home group on this list on a screen under the INDIVIDL source group name.

The attached Appendix A sets forth specific exemplary operator instructions for interacting with one version of the menu driven software executed by system manager 416 in the preferred embodiment.

SYSTEM MANAGER MESSAGE FORMATS

The following describes exemplary messages and message conventions communicated between system manager 416 and site controller 410.

MESSAGE PROTOCOL

Messages are transmitted between system manager 416 and site controller 410 in 8-bit data packets delimited by frame start characters and checksum characters. Each packet starts with a frame byte character of OAA hex. The internal structure of a packet is as follows:

```
ff tt dd dd dd ... dd cc
``` where ff is the frame sync character (OAA hex),
tt is the message type byte (which defines the content of the message),
dd are data bytes, and
cc is a checksum (formed by taking the exclusive OR of each byte in the message, starting with the message ID byte, and then negating the result).

ACKNOWLEDGEMENT RULES

Any valid message received is acknowledged. A valid message is defined as one in which the checksum of the data bytes matches the checksum transmitted. If a packet is received but has an invalid checksum, a negative acknowledgement (NACK) is sent.

Messages are transmitted singly threaded, waiting for an acknowledgement before sending the next message. Receiving a negative acknowledgement results in immediate retransmission of the packet. If an acknowledgement is not received within two seconds, the same message is retransmitted. Retransmission should occur three times before erroring out.

An acknowledgement message has the following form:

| ff | AA |
| tt | 00 |
| cc | FF (checksum of 00) |

A negative acknowledgement message has the following form:

| ff | AA |
| tt | FF |
| cc | 00 |

FIG. 15 is a flowchart of exemplary program control steps performed by both system manager 416 and site controller 410 to transfer messages in the format above between the two of them.

SYSTEM MANAGER TO SITE CONTROLLER MESSAGES

The following describes exemplary messages used to communicate dynamic regrouping commands and information from the system manager to site controllers in the preferred embodiment.

REGROUP BUFFER REQUEST — MESSAGE TYPE 37

The regroup buffer request is implemented to allocate/extend a dynamic regroup control buffer from the site controller. When received, the site controller will scan the regroup control blocks (RCB) for a match of the destination group id. Providing no match is found and the appropriate buffer space is available, the site controller will create an RCB for the specified destination group id. However, if there is a positive match between the destination group id and an RCB, the site controller will extend the buffer space available for that regroup.

A response from the site controller is generated from reception of this command.

| | |
|---|---|
| MM | Message type (37) |
| D1  D2 | Destination group id (0-2048) |
| D3  D4 | Number of units to be regrouped (0-1024) |
| D5 | Regroup qualifier |

Regroup Qualifier

| B7 | B6 | B5 | B4 | B3 | B2 | B1 | B0 |
|---|---|---|---|---|---|---|---|
| Plan number for regroup | | | | Not used | Fleet Decode Field | | |

Fleet decode field contains the number of bits required by the mobile to properly decode the fleet. Plan number is the number used in the regroup commands.

SUBMIT COMMAND — MESSAGE TYPE 38

The purpose of the submit command is to place the specified unit into the regroup control buffer identified in the destination group id.

| | |
|---|---|
| MM | Message type (38) |
| D1  D2 | Destination group id (0-2048) |
| D3  D4 | Home group id (0-2048) |
| D5  D6 | Logical id (0-16383) |
| D7 | Request qualifier (see below) |
| D8 | Status qualifier (see below) |

Request Qualifier

| B7 | B6 | B5 | B4 | B3 | B2 | B1 | B0 |
|---|---|---|---|---|---|---|---|
| Unused | | | | Type Request | | Group Knob Setting | |

Type request:

-continued

| Request Qualifier | |
|---|---|
| 00 ------> | Forced select, no deselect |
| 01 ------> | Forced select, optional deselect |
| 10 ------> | Undefined |
| 11 ------> | Optional select |
| Group knob setting: | |
| 0 ... 7 - | Associates regroup with group knob setting |

| Status Qualifier | | | | | | | |
|---|---|---|---|---|---|---|---|
| B7 | B6 | B5 | B4 | B3 | B2 | B1 | B0 |
| A | B | C | D | E | ! | Unused | |

A active pending; B active; C cancel pending; D cancelled; E report status - (must be cleared when resolving units)

START REGROUP REQUEST — MESSAGE TYPE 39

A start regroup request is issued to initiate the regroup process. Once issued, the site controller will attempt to regroup all units in the specified buffer until (1) all units have been regrouped or (2) a discontinue regroup command is received.

The retry count identifies the number of attempts to make before reporting the status back to the system manager. A start regroup request with a retry count of zero is decoded as a discontinue/halt regroup command. When received, regroup processing is discontinued until resumed. Buffer contents remain the same.

| : . MM . | | Message type (39) |
|---|---|---|
| : . . D1 . . : . . D2 . . | | Destination group id (0-2048) |
| : . . D3 . . | | Report count (0-255) |
| : . . D4 . . | | Regroup status (see below) |

| Regroup Status | | | | | | | |
|---|---|---|---|---|---|---|---|
| B7 | B6 | B5 | B4 | B3 | B2 | B1 | B0 |
| Unused | | | | | | | A |

A) process foreground flag

1 ------> process foreground

STATUS FEEDBACK REQUEST — MESSAGE TYPE 3A

This command is used to request a list of all units that have acknowledged the specified regroup. Once this command is received and decoded by the site controller a stream of status feedback responses will be sent identifying units that have acknowledged the regroup.

| : . MM . | Message type (3A) |
|---|---|
| : . . D1 . . : . . D2 . . | Destination group id (0-2048) |

DELETE BUFFER COMMAND — MESSAGE TYPE 38

The primary purpose of this command is to free up regroup buffer space in the site. This command gives the system manager the option of deleting a single element or deleting the entire group. If the delete qualifier contains a zero, the unit specified in the logical id field will be deleted. If the delete qualifier is a one, the entire regroup buffer will be deleted.

| : . MM . | | Message type (41) |
|---|---|---|
| : . . D1 . . : . . D2 . . | | Destination group id (0-2048) |
| : . . D3 . . : . . D4 . . | | Home group (0-2048) |
| : . . D5 . . : . . D6 . . | | Logical id (0-16383) |
| : . . D7 . . | | Delete qualifier (see below) |

| Delete Qualifier | | | | | | | |
|---|---|---|---|---|---|---|---|
| B7 | B6 | B5 | B4 | B3 | B2 | B1 | B0 |
| Unused | | | | | | | A |

A) Delete qualifier:

0 ------> Individual unit delete

1 ------> Regroup delete

PLAN LEVEL BIT MAP (FOR PLAN NUMBER X) — MESSAGE TYPE 16

Used to tell the site controller (which then tells the control channel) the state of each plan in the system. All plans are assumed to be not resident and not active initially.

| : . MM . | Message type (22) |
|---|---|
| : . . D1 . . | Plan number and bit states |

| Plan Number and Bit States - Layout | | | | | | | |
|---|---|---|---|---|---|---|---|
| B7 | B6 | B5 | B4 | B3 | B2 | B1 | B0 |
| Unused | Active bit state | Resident bit state | Plan number (0–15) | | | | |

SITE CONTROLLER TO SYSTEM MANAGER MESSAGES

The following are exemplary formats of messages used to communicate dynamic regrouping information from the site to the system manager.

REGROUP REQUEST RESPONSE — MESSAGE TYPE 37

This command is sent in response to a regroup buffer request. If the buffer space requested is available, the site controller will allocate the space requested and report the remaining space allotment. If the requested buffer space is not available, the site controller will utilize this command to report the remaining space allotment.

| . . MM . | Message type (37) |
|---|---|
| . . . D1 . . : . . D2 . . | Destination group id (0-2048) |
| . . . D3 . . : . . D4 . . | Number of elements available (0-1024) |
| . . . D5 . . | Ack/Nak (0-255) |

START REGROUP REQUEST RESPONSE — MESSAGE TYPE 39

Upon receiving a start/initiate regroup request, this command will be issued to acknowledge reception of the command and confirmation of the regroup id.

| : . MM . | Message type (39) |
|---|---|
| : . . D1 . . : . . D2 . . | Destination group id (0-2048) |
| : . . D3 . . | Ack/Nak (0-255) |

STATUS FEEDBACK RESPONSE — MESSAGE TYPE 3A

The site controller will issue this command to alert the system manager that a regroup (pass) has been completed on the group identified in the destination group id field. The system manager will then use the information contained (group id) to issue a status feedback request. When the request is received, the site controller will utilize this command to report back to the system manager the unit that has acknowledged the regroup request.

| . . MM . | | | | | Message type (3A) | | | |
|---|---|---|---|---|---|---|---|---|
| . . D1 . . : . . D2 . . | | | | | Destination group id (0-2048) | | | |
| . . D3 . . : . . D4 . . | | | | | Logical id (0-16383) | | | |
| . . D5 . . | | | | | Unit status (see below) | | | |
| | | | Unit Status | | | | | |
| B7 | B6 | B5 | B4 | B3 | B2 | B1 | B0 | |
| A | B | C | D | E | | Unused | | |

A active pending; B active; C cancel pending; D cancelled; E report status - (must be cleared when resolving units)

INTERACTION BETWEEN SITE CONTROLLER AND SYSTEM MANAGER

The techniques by which regroup plan parameters are interactively inputted and displayed by system manager 416 have already been described. The interactive software used to perform these display, input and data storage functions are menu-driven modules that result in storing the inputted parameters in disk files on system manager fixed disk 604. When the operator of system manager 604 issues a command to make a dynamic regroup plan (or a particular destination group from plan) "resident", system manager 416 issues a "regroup buffer request" message to each site controller 410 of system 100 at high speed over landland links in the preferred embodiment (FIG. 16 block 902). The regroup buffer request command causes each site controller 410 in communication with system manager 416 (the system manager is typically in communication simultaneously with all site controllers in a multiple site system) to allocate and/or extend its regroup control block 1420 to add additional queue elements 1422 corresponding to regroups in the regroup plan to be made resident.

When site controller 410 receives this regroup buffer request, it scans its regroup control block 1420 to determine whether there are any records 1422 with a matching destination group identification field 1424. If no match is found in the appropriate buffer space, the site controller creates a new record 1422 with the specified destination group. If there is a record already existing specifying that regroup, on the other hand, site controller 410 extends the buffer space available for that regroup. Site controller 410 then responds by generating the "regroup request response" message which acknowledges receipt of the request and reports remaining space allotted to the buffer 1420.

System manager 416 may then submit commands to various sites by transmitting "submit command" messages (FIG. 16 block 904). Each "submit command" specifies an individual transceiver to be regrouped into a new or existing plan. Site controllers 410 receiving "submit command" messages from system manager 416 add records to queue 1402 corresponding to units specified by the submit commands — ensuring that the records created in buffer 1420 corresponding to the regroup are updated to point into queue 1400 and also ensuring that queue 1400 home group id fields 1406 reflect the proper regroup (and, of course, also ensuring that duplicate queue elements are not created). Since system manager 416 generally has no way to tell what sites are serving particular units to be regrouped, the system manager transmits the submit command messages to all sites (or to particular multiple or single sites if the unit can be guaranteed to be operating within a subset of possible sites) to thereby automatically permit "searching" for mobile units during the course of normal dynamic regroup phase I and phase II signaling.

When all individual mobile units to be regrouped have been specified by "submit command" messages, system manager 416 may initiate the regrouping process by issuing a "start regroup request" message to all sites (FIG. 16 block 906). Site controller 410 updates retry count field 1432 of the appropriate record 1422 in regroup control buffer 1420 in response to the "start regroup request" message and issues a "start regroup response" message back to system manager 416 positively acknowledging receipt of the "start regroup request" message. Site controller 416 then begins performing the main regrouping routine shown in FIG. 8 and discussed previously, and continues to perform this routine for the specified regroup until all units have been regrouped or until system manager 416 issues a discontinue regroup command.

In the preferred embodiment, site controller 410 operates on the regroup level rather than on the plan level. That is, site controller 410 is only responsible for making regroups — and not entire plans — resident or active. System manager 416 provides the coordination in the preferred embodiment to permit activation on the regroup plan level (e.g., by issuing multiple start regroup request messages — one for each regroup in a particular plan), and also for coordinating between sites.

Periodically during the regrouping process (and at any time upon the request of an operator of system manager 416), the system manager may issue a "status feedback request" message to request a list of all units that have acknowledged in the specified regroup (block 908) — and in which the regroup is therefore resident — from each site. In response to receipt of a "status feedback request" message, site controller 410 transmits a "status feedback response" message — a stream of status feedback responses identifying individual units that have acknowledged outbound control channel dynamic regroup messages. In the preferred embodiment, site controller 410 obtains this information by simply transmitting a list of all units in queue 1400 corresponding to particular regroup with status fields 1410 indicating that the unit has acknowledged. When system manager 416 receives this information, it resolves units from different sites (block 910) to prevent one site from continuing to attempt to regroup units that have already been regrouped by other sites. For example, if system manager 416 receives a "status feedback response" message from site A stating that a particular mobile unit has acknowledged a dynamic regroup message, the system manager transmits "delete buffer command" messages to all other sites specifying that individual unit — thus preventing the other sites continuing to attempt to regroup that unit (block 912).

The status feedback response messages returned by site controllers 410 to system manager 416 are also used by the system manager to update its "units" screen to indicate whether individual units have or have not been "regrouped". The operator of system manager 416 may monitor this unit screen and watch as the status of different units change from "not yet regrouped" to "regrouped".

System manager 416 also maintains a current disk file listing of all units that have been regrouped in a particular regroup, and periodically tests this listing against the "percentage required" and "critical unit count" information specified at the time the regroup was specified. The most current results of this comparison are displayed on the "units screen". When this stored list of acknowledged units in a specific regroup contain both (a) the requisite percentage of units and (b) the requisite specific critical units needed to make the regroup effective, system manager 416 may automatically issue an updated plan level bit map message to inform all site controllers of the state of all plans on system 100 — and specifying an active status for regroup (or the operator of system manager 416 can override the percentage/critical unit defaults at any time to force such a message to be generated). The effect of this bit map message command is to activate the regroup on system 100 in the manner explained above in connection with FIG. 14.

System manager 416 may deactivate an active regroup by issuing a further updated plan level bit map specifying a particular regroup is to be inactive (or inactive or non-resident). The effect of this further command is to cause all site controllers to issue modify dynamic regroup bit map messages — and ultimately, to cause all mobile radios to autonomously respond by deactivating and/or making non-resident plans specified in the bit map information. This type of deactivation can be used in a "panic" situation or in an emergency (e.g., to immediately abort a regroup plan having unexpected results or for some reason interfering with critical communications), although the "normal" method of making resident regroups non-resident is to perform steps 902-912 — except that system manager 416 issues "submit command" messages with "status qualifier" fields specifying "cancel" rather than "active pending" status. All of the same steps (including acknowledgements) performed by site controllers 410 and mobile transceivers 150 to make a regroup plan resident are then performed to make the regroup plan "non-resident".

In addition, system manager 416 maintains an historical dynamic regroup bit map including the sixteen most recently resident regroup plans (with all non-resident plans having both resident and active bit unset) so that, for example, any mobile transceiver that was powered-off or removed from the coverage of communications system 100 at the time a regroup was active will, upon locking onto the system control channel, soon make the plan (which should still be resident in its internal memory) non-resident in response to a bit map message on the outbound control channel. New plans are assigned arbitrary "plan numbers" (0-16) for purposes of the outbound control channel bit map messages (and dynamic regroup messages) — with new plan numbers being assigned to overlay the oldest deactivated plan (so that the historical deactivation data stays in the system as long as possible).

SAMPLE COMMUNICATION SESSIONS

The following chart describes sample communication exchanges between the system manager and the site controller in the preferred embodiment for initiating a sample dynamic regrouping process:

| System Manager | | Site Controller |
|---|---|---|
| Regroup buffer request | → | |
| | | ← Regroup buffer response |
| Submit command | → | |
| Submit command | → | |
| . | | |
| Submit command | → | |
| Start regroup request | → | |
| | | ← Start regroup response |
| | | + + |
| | | + Processing + |
| | | + + |
| Status feedback request | → | |
| | | ← Status feedback response |
| | | ← Status feedback response |
| | | . |
| | | ← Status feedback (end) |
| + + | | |
| + Resolving units + | | |
| + + | | |
| Delete unit command | → | |
| Delete unit command | → | |
| . | | |
| Delete unit command | → | |

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

APPENDIX

SETTING UP A DYNAMIC REGROUP

To set up a Dynamic Regroup Plan you must enter and save information about the Plan on the three Dynamic Regroup screens (Directory, Define, and Units) in the following order:

1. ENTER THE PLAN NAME on the Directory screen

2. ENTER THE DESTINATION GROUP NAME on the Directory screen

3. CREATE A DEFINE RECORD FOR THE DESTINATION GROUP on the Define screen

4. ENTER THE SOURCE GROUP NAME on the Directory screen

5. SELECT THE UNITS from the Units screen (or enter the Unit names on the Unit screen)

Steps 1 and 2 place the Plan and Destination group names in associated Dynamic Regroup Directories. Step 3 creates a record that defines the conditions the Destination Group operates under when activated. Step 4 places the Source group name in the associated Dynamic Regroup Directory. Step 5 involves either selecting units from the Source group to form the Destination Group or entering the names of the units in the Destination Group.

NOTE

> The Directory screen initially displays only the names of the Plans set up. Each Plan will have a Destination Groups Directory and each Destination Group will have a Source Groups Directory. Once they are set up, the Plan (or Plan/Destination Group) must be selected using the command line before the associated directories appear.

Select Dynamic Regroup from the menu and start with the Dynamic Regroup Directory screen:

1. ENTER PLAN NAME

Enter a unique Plan name in the Plan: field (up to 8 alphanumeric characters). Press Return.

Enter a description of the Plan in the Description: field (up to 2 lines, 40 characters per line).

Press F7 (SAVE). The Plan name will appear in the Plan Directory.

| | |
|---|---|
| 2. ENTER DESTINATION GROUP NAME* | Enter the name of the Plan created in Step 1 in the Plan: field and press Return.** |
| | Enter a unique Destination group name in the Destination: field (up to 8 characters), press Return. The Define screen will appear with the word CREATE in the upper right corner. |
| 3. CREATE DEFINE RECORD | The name of the plan will appear in the Plan: field. If the name of the Destination Group entered in Step 2 appears in the Dest. Group: field, then press Return. Otherwise, enter the Destination Group name in the Dest. Group: field and press Return. |
| | Enter the percent (1-100) of non-critical units that must respond before the Regroup can be considered "active" in the Percent Req.: field. Press Return. |
| | Enter a description (up to 2 lines, 40 characters per line) of the Destination Group in the Description: field and press Return. |
| | Enter the Agency Number assigned to the Destination Group in the Agency: field and press Return. |
| | Enter the Fleet Number assigned to the Destination Group in the Fleet: field and press Return. |
| | Enter the Subfleet Number assigned to the Destination Group in the Subfleet: field and press Return. |

\* For Plans with multiple Destination groups, complete Steps 2-5 using the first Destination Group name and then refer to "PLANS WITH MULTIPLE DESTINATION GROUPS".
\*\* If Plan name appears in the Plan: field, just press Return.

| | |
|---|---|
| | Enter an A (Agency) or F (Fleet) or S (Subfleet) or D (Dynamic) in the Record Type: field to identify the record type and press Return. |
| | Move the cursor to the Active: field and enter a Y under all the site numbers that will participate in this regroup. Designate at least one site. Press Return. |

The remaining fields are optional. See the Define Screen Optional Fields.

When completed, press F7 (SAVE) and then F6 (EXIT). The Directory screen will appear.

4. ENTER SOURCE GROUP NAME\*   Enter the name of the Plan created in Step 1 in the Plan: field and press Return.*

Enter the name of the Destination group created in Step 2 in the Destination: field, press Return.

Enter the name of the Source group in the SOURCE: field. (This name will either be a valid Group name from the System Manager Database or INDIVIDL). Press Return. The Units screen will appear.

5. SELECT UNITS   If you identified a valid Group name as the Source group, read <u>Units from Source Group : (Valid Group Name)</u> and continue with Unit Screen Options.

OR

If you identified INDIVIDL as the Source group, read <u>Units from Source Group : INDIVIDL</u> and continue with Unit Screen Options.

* For Destination groups with multiple Source groups complete Steps 4-5 using the first Source Group name and then refer to "DESTINATION GROUPS WITH MULTIPLE SOURCE GROUPS".

<u>Units from Source Group : (Valid Group Name)</u>

The Units screen will display the units (by Unit name) from the specfied Source group as they appear in the System Manager Database. The Knob Setting (K field) for each unit defaults to 1.

Initially, the first page will be displayed. If the Source group contains more units than can be displayed on one screen page, multiple screen pages will be created as indicated in the "Page X of X " field in the upper left corner of the screen. Use the NEXT SCREEN and PREV SCREEN keys to move from page to page. Use the function keys to select units for the Destination group and to identify which units are critical to the Destination group. Refer to the Unit Screen Options. Attributes are applied to the Unit name as you make these choices (see UNIT NAME ATTRIBUTES).
When all changes to a page are completed, press F7 (SAVE). After reviewing all pages, purge the unselected units with the F19 (PURGE). Before exiting, the screen(s) should display only the Unit names you want included in the Destination group.

NOTE: To retrieve the units in the original Source group, unselect all units and press F19 (PURGE). Wait for the names of all units in the original Source group to appear and start over.

<u>Units from Source Group : INDIVIDL</u>

The Units screen will initially display only blank Unit fields. You must enter the valid unit name (from the System Manager Database) of each unit you want included in the Destination group in the fields provided.
Enter a unit name. The Knob Setting (K field) for each unit defaults to 1.
Each valid Unit entered is automatically "selected" for the Destination group so the Unit name will appear in reverse video. Use the function keys to identify which units are critical to the Destination group. Refer to the Unit Screen Options. Attributes are applied to the Unit name as you make these choices (see UNIT NAME ATTRIBUTES).
When all changes to a page are completed, press F7 (SAVE). Before exiting, this screen should display only the Unit names you want included in the Destination group.

UNIT NAME ATTRIBUTES

| If the Unit is: | The Unit Name will appear in: |
|---|---|
| Selected for the Destination Group | Reverse Video |
| Selected for and Critical to the Destination group | Reverse Video/Bold |
| Not Selected for the Destination Group | No Attributes |

UNIT SCREEN OPTIONS

| If You Want To: | Then: |
|---|---|
| Select/Unselect All Units on the Page | Press F14 (SELALL). |
| Select a Unit | Locate the cursor on the unselected Unit name you want to select and press SELECT. |
| Unselect a Selected Unit | Locate the cursor on the selected Unit name you want to unselect and press SELECT. |
| Identify a Unit as Critical | Locate the cursor on the non-critical Unit name and press F12 (CRITICAL). If unit is unselected, F12 also selects it. |
| Change a Critical Unit to Non-Critical | Locate the cursor on the selected critical Unit name and press F12 (CRITICAL). Unit remains selected and changes to non-critical. |
| Change the Select Type of a Unit | Unit field headings must read Unit-T. If not, press F18 (KNOB/SEL) to change. Locate cursor on T field of desired unit and overwrite T field (0-2). |
| Change the Knob Setting of a Unit | Unit field headings must read Unit-K. If not, press F18 |

|  |  |
|---|---|
|  | (KNOB/SEL) to change. Locate cursor on K field of desired unit and overwrite K field (1-8). |
| Add a Unit** | Locate the cursor on the first position of an empty Unit field. Enter the name of the unit. Change the Select Type and Knob Setting, if desired. |
| Purge All Unselected Units | Press F19 (Purge). Deletes the unselected units and rearranges the selected units alphabetically. |

\* Press F10 for new page, if desired.
\*\* Unit must be a valid unit in the System Manager Database.

```
                        NOTE
PRESS F7 (SAVE) WHEN ALL SELECTIONS AND CHANGES ON A PAGE ARE MADE.
 AFTER ALL PAGES ARE COMPLETED PRESS F6 (EXIT).
```

PLANS WITH MULTIPLE DESTINATION GROUPS

Each Plan can have up to 14 Destination groups. For each Destination group within a plan, you must have a Define record and a Unit record. Select the same Plan from the Plan Directory by typing the Plan name in the Plan: field and press Return. Enter the next Destination group name in the Destination: field and press Return. Assign different Agency-Fleet-Subfleet numbers to each Destination group within a Plan so that you will have the option of regrouping all Destination groups (activate the Plan) or regrouping the Destination groups separately. When completed, the Destination Group name will appear in the Destination Group Directory. Repeat for each Destination Group.

DESTINATION GROUPS WITH MULTIPLE SOURCE GROUPS

Each Destination group can name up to 21 Source groups. Only one of the 21 Source groups can be INDIVIDL.
Select the same Plan from the Plan Directory by typing the Plan name in the Plan: field and press Return. The Destination Group name will appear in the Destination Group Directory. Select the Destination Group by typing the Destination Group name in the Destination: field and press Return. Enter the name of the next Source Group in the Source: field. Press Return. Follow the instructions in Step 5. When completed the Source Group Name will appear in the Source Group Directory. Repeat for each Source Group.

DEFINE SCREEN

INFORMATION FIELD

|  |  |
|---|---|
| Plan Name | Name of the Plan (as entered on the Directory screen) that the Destination group belongs to. |

REQUIRED FIELDS

Dest. Group  
DESTINATION GROUP. The name (up to 8 characters) of the Destination group.

Percent Req.  
PERCENT REQUIRED. The percent (1-100) of non-critical units that must respond before the Regroup can be considered "ACTIVE".

Description  
Description (up to 2 lines, 40 characters per line) of the Destination group.

Agency Number  
Agency number assigned to the Destination group.

Fleet Number  
Fleet number assigned to the Destination group.

Subfleet Number  
Subfleet Number assigned to the Destination group.

Record Type  
System generated based on the entries in the A-F-S field. Press Return with cursor in Record Type field. Identifies the Destination group record as an Agency, Fleet, Subfleet or Dynamic record. To change the Record Type to Dynamic, overwrite the first position of the field with the letter D and press Return.

Active (Y)  
A Y/N (YES/NO) 32 position field which specifies which of the 32 possible sites will participate in the Regroup of this Destination group. At least one valid site must be designated Y.

OPTIONAL FIELDS

Console Name  
Name (up to 8 characters) of the console assigned to the Destination group.

Console Bay Number  
Bay Number of the console named.

Console Module  
Number of the module in the Console Bay assigned to the Destination group.

Division  
Name of the division associated with the Destination group.

Name  
Name of the person responsible for the Destination group.

Street City State Zip  
Permanent mailing address of the person responsible for the Destination group.

| | |
|---|---|
| Phone Number | Telephone number where the person responsible for the Destination group can be reached. |
| Hang Time | Length of time (0-255 seconds) the working channel keeps the channel up before issuing a drop channel message. |
| Priority | Operational priority (0-7) of the Destination group. Priority is used by the site controller only when no channels are available and a channel request is made. |

FUNCTION KEYS

| | |
|---|---|
| F6 EXIT | Returns to the Dynamic Regroup Directory screen. |
| F7 SAVE | Saves the newly entered valid information. |
| F10 CLEAR | Clears the data from the screen and displays a blank record form, with the exception of the Plan name which remains as entered on the Directory screen. |

UNIT SCREEN

REQUIRED FIELDS

| | |
|---|---|
| Unit | Heading for the unit fields directly below. The unit fields will either display valid Unit names, blank unit fields or a combination of both. Blank unit fields provide space to add Unit names. |
| T | Heading for the Select Type field directly below it.<br>Select Type of the unit (0-2) is a code that specifies if the control unit will be forced to regroup or not and if the user can or cannot leave or return to the regroup by turning the Group knob on the control unit.<br><br>0 = Forced to regroup, Cannot change<br>1 = Default. Forced to regroup, Can change.<br>2 = Not forced to regroup, Can change. |
| K | Heading for the Knob Setting field directly below it. Specifies the Group Knob Setting on the control | unit (1-8). Units in more than one regroup must have a different Knob Settings for each Destination group.

INFORMATION FIELDS

| | |
|---|---|
| Page XX of XX | Current screen page number and the total number of pages used for the units display. |
| Current Mode | Current mode of the Destination group BUILD (INACTIVE), ACTIVE, ACT STP (ACTIVE STOPPED), or REMOVE (CANCEL). |
| Regroup Plan | Name of the Regroup Plan (from the Directory file) the Unit record belongs to. |
| Units from Source Group | Name of the group in the System Manager database that the units are displayed from. |
| Destination Group | Name selected for the Destination group (from the Define record). |
| Group Level | Displays the Group Level (Agency, Fleet or Subfleet) of the Source group. |
| Description | Destination group description from the Define record. |
| Percentage Required | Percent of non-critical units that must respond before the regroup can be considered "ACTIVE" (from the Define record). |
| Complete | Percent of non-critical units submitted that have been activated. |
| Critical Unit Count | Number of critical units submitted. |
| Resolved | Number of critical units submitted that have been activated. Must equal the Critical Unit Count for regroup to be considered "ACTIVE". |

FUNCTION KEYS*

| | |
|---|---|
| F6 EXIT | Returns to the Directory screen. |
| F7 SAVE | Saves the displayed screen. |
| F9 NXTGRP | NEXT GROUP. Displays the first page of units in the next Source group defined for the Destination group. |
| F10 NEWPAG | NEW PAGE. Creates and displays a blank unit page for adding units. |

| | |
|---|---|
| F12 CRITICAL | Used to identify a unit as Critical/Non-critical. |
| F14 SELALL | SELECT ALL. Selects/Unselects all units on the displayed page. |
| F18 KNOB/SEL | KNOB/SELECT. Alternately displays the Unit K field, Group Knob Setting (1-8) and the Unit T field, Select Type (0-2). |
| F19 PURGE | Removes all the units not selected in the Source group. Displays selected units alphabetically in the Destination group. |
| F20 MORE | Displays additional function keys. |
| SELECT | Selects/Unselects a unit. Cursor must be within the desired unit field. Does not operate in REMOVE Mode. |
| NEXT SCREEN | Displays the next units screen page in the unit file or a message if the last page is currently displayed. |
| PREV SCREEN | PREVIOUS SCREEN. Displays the previous units screen page or a message if the first page is currently displayed. |

*F11 (MODCRIT), F17 (STATUS), INSERT and REMOVE are defined in the Operations Section and used only in Active Mode.

OPERATIONS

The Dynamic Regroup Directory screen is divided into two sections: Command lines on the upper portion and Directory displays on the lower portion. Use the command line (upper portion) to select a Plan, Plan/Destination Group, or Plan/Destination Group/Source Group for an operation from the Directories (lower portion).
Each Dynamic Regroup Plan has 2 additional associated screens: a Define screen that defines the conditions the regroup operates under during activation and a Units screen that displays the unit name of each unit in the Plan. Operational instructions for these screens are included in this section. Depending on the operation selected, the associated screen displays may or may not appear.
This function will allow you to activate from the Plan level or from the Destination Group level.
If you activate the regroup from the Plan level, all Destination Groups associated with the Plan will also be activated.
If you activate the regroup from the Destination Group level, only the Destination Group selected will be activated.
When a Dynamic Regroup Plan (or a Destination Group within a Plan) is submitted for activation, the units that are selected on the Plan's Unit screen are reassigned one by one from their original group to the regroup. When all of the units marked "critical" on the Unit screen and the required percent of non-critical units (on the Define screen) are regrouped, a message will appear to declare the Plan "ACTIVE". You can activate more than one plan at a time however, a given unit can only participate in one plan at a time.

After a Plan is submitted for activation and prior to the Plan being declared "ACTIVE", you can:

- o STOP (and RESTART) the REGROUPING PROCESS to allow another Plan submitted for activation to regroup sooner.

- o MODIFY the PERCENT of NON-CRITICAL UNITS REQUIRED to allow selected activated Plan to regroup sooner.

- o MONITOR the UNITS by checking the status of each unit in terms of whether the unit is regrouped (Active), in the process of being regrouped (Pending) or if the unit is cancelled (reassigned to its original group).

Once a Plan is "ACTIVE", you can:

- o ADD or REMOVE UNITS to/from the REGROUP by accessing the Plan's Units screen.

The Plan can be cancelled by selecting the Plan on the Directory screen and using the REMOVE key. The units are then reassigned back to their original group. When all units are contacted, a message appears to declare the Plan cancelled.

DYNAMIC REGROUP DIRECTORY

```
              GE 16-PLUS TRUNKING SYSTEM
                 Dynamic Regroup Plan
                       Directory Plan :         Destination :         Source :

Description :

Plans        |Destination Groups|   Source Groups
        -------------------------------------------------------
                      |                  |
                      |                  |
                      |                  |
                      |                  |
                      |                  |
                      |                  |

F6    F7    F8      F12    F14    DO    F17   F18
   EXIT SAVE DELETE   MODPCT GRPSCREEN SUBMIT STOP RESTART REMOVE
```

```
                         NOTE
    Each Plan has a Destination Groups Directory and each
    Destination Group has a Source Groups Directory. The
    Plan (or Plan/Destination group) must be selected before
    the associated directories appear.
```

DIRECTORY NAME ATTRIBUTES

| If the name appears in: | Then the Plan or Destination group is: |
|---|---|

| | |
|---|---|
| No Attributes | Build Mode (Inactive) |
| Highlighted, Underlined | Active or Active Stopped Mode |
| Low Intensity, Underlined | Remove Mode (in process of being cancelled) |

Plan/Destination group names also appear in Reverse Video when selected.

TO SELECT A PLAN

Enter the name of the Plan name you want to select (from the Plan directory) in the Plan: field and press Return. Choose an option and continue.

Options for Plan in Active Mode

| | |
|---|---|
| Remove (Cancel) Active Plan | Press REMOVE key. Cancels the activated Regroup Plan and reassigns all units in the regroup back to their original group. When completed, the message PLAN XXXXXXXX CANCELLED will flash across the bottom of the screen and the Plan will return to Build Mode. |

Options for Plan Submitted for Activation

| | |
|---|---|
| Stop Activated Plan | Press F17 (STOP). Stops the Regroup process for the selected Plan. |
| Restart "Stopped Active" Plan | Press F18 (RESTART). Restarts the Regroup process. |
| Select a Destination Group | Enter the name of the active Destination group you want and press Return. See options under "Select a Destination Group". |
| Monitor Units | Enter the name of the active Destination group you want to monitor and press Return. Enter the desired Source group name and press Return. The Units screen will appear. |
| Modify the Percent | Enter the name of the active Destination group you want and press F14 (GRPSCREEN). Overwrite the Percent Req.: field. Press F7 (SAVE) then F6 (EXIT). Press F12 (MODPCT) to send the change to the regroup scheduler. |

Options for Plan in Build Mode

| | |
|---|---|
| Activate the Plan | Press DO. Attempts to submit for activation the units selected in all the Destination groups associated with the Plan. When |

| | |
|---|---|
| | completed, the message PLAN XXXXXXXX ACTIVE will flash across the bottom of the screen. |
| Delete the Plan | Press F8 (DELETE). Also deletes all Destination and Source groups (Define and Unit records) associated with the Plan. |
| Change the Description | Overwrite the Description: field. Press F7 (SAVE). |
| Select a Destination Group | Enter the name of the Destination group you want and press Return. See options under "To Select a Destination Group". |
| Add Destination Group(s) | Enter the name of the Destination group to be added. Press Return. See "Setting Up a Dynamic Regroup. |
| Display Units | Enter the name of the Destination group you want, press Return. Enter the name of the Source group you want and press Return. The Units screen will appear. |

TO SELECT A DESTINATION GROUP

After a Plan is selected, enter the name of the Destination Group you want (from the Destination Group directory) in the Destination: field and press Return. Select an option and continue.

<u>Options for Destination Group in Active Mode</u>

| | |
|---|---|
| Remove (Cancel) Active Destination Group | Press REMOVE. Cancels the active Regroup Plan and reassigns all units in the regroup back to their original group. When completed, the message PLAN XXXXXXXX DESTINATION XXXXXXXX CANCELLED will flash across the bottom of the screen. |

<u>Options for Destination Group Submitted for Activation</u>

| | |
|---|---|
| Stop Activated Destination Group | Press F17 (STOP). Stops the regroup process for the selected Plan/Destination group. |
| Restart "Stopped Active" Destination Group | Press F18 (RESTART). Restarts the regroup process. |
| Modify the Percent | Press F14 (GRPSCREEN). Overwrite the Percent Req.: field. Press F7 (SAVE) then F6 (EXIT). Press |

| | |
|---|---|
| | F12 (MODPCT) to send the change to the regroup scheduler. |
| Monitor Units | Enter the name of the Source group you want and press Return. The Units screen will appear. Press F17 to display the status of each unit. |

Options for Destination Group in Build Mode

| | |
|---|---|
| Activate the Destination Group | Press DO. Attempts to submit for activation only the selected units in the selected Destination group. When completed, the message PLAN XXXXXXXX DESTINATION XXXXXXXX ACTIVE will flash across the bottom of the screen. |
| Delete the Destination Group | Press F8 (DELETE). Also deletes all Source group names (and Define and Unit records) associated with the Destination group. |
| Change Data in Define Record | Press F14 (GRPSCREEN). Overwrite the data in desired fields. Press F7(SAVE). Press F6 (EXIT). |
| Display Units | Enter the name of the Source group you want and press Return. The Units screen will appear. |
| Add Source Group(s) | See Setting Up a Dynamic Regroup. |

TO SELECT A SOURCE GROUP

After the Plan and Destination Group are selected, enter the name of the Source Group you want (from the Source Group directory) in the Source: field and press Return. The Units screen will appear. See Unit Screen Operations.

DIRECTORY SCREEN
FIELDS

| | |
|---|---|
| Plan | Name (up to 8 characters) of the selected Plan. |
| Destination | Name (up to 8 characters) of the selected Destination group. |
| Source | Name (up to 8 characters) of the selected Source group. |
| Description | Description (up to 2 lines, 40 characters per line) of the selected Plan. |

FUNCTION KEYS

F6 EXIT  Exits the Dynamic Regroup function and returns to the Supervisor's Menu.

F7 SAVE  Saves all newly entered valid information.

F8 DELETE  Deletes the selected Plan or Destination group and associated Define and Unit records.

F12 MODPCT  MODIFY PERCENT. Used only after a Plan has been activated and before it is declared active to send a Percent Required change to the regroup scheduler. Change and save the Percent Required on the Define screen first and then return to the Directory screen and press F12.

F14 GRPSCREEN  GROUP SCREEN. Displays the Define screen for the selected Plan and Destination group.

DO SUBMIT  Submits the units for the selected Plan (or selected Plan/Destination group) for activation. When all of the critical units and the specified percent of non-critical units are activated, the message PLAN XXX DESTINATION XXX ACTIVE will flash across the bottom of the screen.

F17 STOP  Places the selected active Plan or Destination group in Active Stopped Mode.

F18 RESTART  Returns the selected Plan or Destination group in Active Stopped Mode to Active Mode.

REMOVE  Cancels the Active Mode for the selected Plan or Destination group.

DEFINE SCREEN

```
                GE 16-PLUS TRUNKING SYSTEM
                Dynamic Regroup Define Screen Plan Name       :      Dest. Group:        Percent Req.:
    Description     :

Agency Number   :      Fleet Number:       Subfleet Number:

Record Type     :
    Console Name    :      Console Bay Number:  Console Module:

(Division)      :
    (Name)          :
    (Street)        :
    (City)          :              (State) :        (ZIP) :

(Phone Number)  :
    Priority        :                       (Hang Time) :
                           111111111122222222223333
    Site Number     :  123456789012345678901234567890123456789012
    Active (Y)      :

F6    F7    F10
    EXIT  SAVE  CLEAR
```

There is a Define record for every Plan\Destination group set up that defines the conditions the Plan\Destination group operates under when it is activated. You can change any of the data on this screen by overwriting the field(s) you want to change. When all changes are completed, press F7 to update the record.

INFORMATION FIELD

Plan Name  Name of the Plan (as entered on the Directory screen) that the Destination group belongs to.

REQUIRED FIELDS

Dest. Group  DESTINATION GROUP. The name (up to 8 alphanumeric characters) of the Destination group.

Percent Req.  PERCENT REQUIRED. The percent (1-100) of non-critical units that must respond before the Regroup can be considered "ACTIVE".

Description  Description (up to 2 lines, 40 characters per line) of the Destination group.

Agency Number  Agency number assigned to the Destination group.

Fleet Number  Fleet number assigned to the Destination group.

Subfleet Number  Subfleet Number assigned to the Destination group.

| | |
|---|---|
| Record Type | System generated based on the entries in the A-F-S field. Press Return with cursor in Record Type field. Identifies the Destination group record as an Agency, Fleet, Subfleet or Dynamic record. To change the Record Type to Dynamic, overwrite the first position of the field with the letter D and press Return. |
| Active (Y) | A Y/N (YES/NO) 32 position field which specifies which of the 32 possible sites will participate in the Regroup of this Destination group. At least one valid site must be designated Y. |

OPTIONAL FIELDS

| | |
|---|---|
| Console Name | Name (up to 8 characters) of the console assigned to the Destination group. |
| Console Bay Number | Bay Number of the console named. |
| Console Module | Number of the module in the Console Bay assigned to the Destination group. |
| Division | Name of the division associated with the Destination group. |
| Name | Name of the person responsible for the Destination group. |
| Street City State Zip | Permanent mailing address of the person responsible for the Destination group. |
| Phone Number | Telephone number where the person responsible for the Destination group can be reached. |
| Hang Time | Length of time (0-255 seconds) the working channel keeps the channel up before issuing a drop channel message. |
| Priority | Operational priority (0-7) of the Destination group. Priority is used by the site controller only when no channels are available and a channel request is made. |

FUNCTION KEYS

| | |
|---|---|
| F6 EXIT | Returns to the Dynamic Regroup Directory screen. |
| F7 SAVE | Saves the newly entered valid information. |

F10 CLEAR                    Clears the data from the screen and
                             displays a blank record form, with
                             the exception of the Plan name which
                             remains as entered on the Directory
                             screen.

UNITS SCREEN

```
Page    of              GE 16-PLUS TRUNKING SYSTEM
                        Dynamic Regroup Units          Current Mode :

Regroup Plan      :                           Units from Source Group :
Destination Group:                                       Group Level :

Description :

Unit   T   Unit   T   Unit   T   Unit   T   Unit   T   Unit   T
       .         .         .         .         .         .
       .         .         .         .  .      .         .
       .         .         .         .         .         .

Percentage Required :     Complete :
              Critical Unit Count :     Resolved :

F6   F7    F9    F10    F11    F12    F14    F17    F18    F19   F20
EXIT SAVE NXTGRP NEWPAG MODCRIT CRITICAL SELALL STATUS KNOB/SEL PURGE MORE

NEXT   PREV            F20
SELECT INSERT REMOVE   SCREEN SCREEN           MORE
```

The Units screen will display all the units (by Unit name) currently
in the Destination Group and along with the Knob Setting and the
Select Type for each unit. Initially, the first page will be
displayed. If the Source group contains more units than can be
displayed on one screen page, multiple screen pages will be created
as indicated in the "Page X of X " field in the upper left corner of
the screen. Use the NEXT SCREEN and PREV SCREEN keys to move from
page to page.
To modify this screen, first check the Current Mode and then refer to
the Unit Screen Options. Attributes are applied to the Unit names
(see UNIT NAME ATTRIBUTES).

UNIT NAME ATTRIBUTES FOR BUILD MODE

| If the Unit Name appears in: | Then the Unit is: |
|---|---|
| No Attributes | Not Selected for the Destination Group |
| Reverse Video | Selected for the Destination Group |
| Bold | Critical Unit |

UNIT NAME ATTRIBUTES FOR ACTIVE, ACTIVE STOPPED and REMOVE MODES

| If the Unit Name appears in: | Then the Unit is: |
|---|---|
| Reverse Video & Underlined | Selected for an operation (e.g.REMOVE) |
| Bold & Underlined | Critical Unit in an Active state* |
| Underlined | In an Active state* |

*Unit active states are: Active, Pending, or Cancelled.

| | |
|---|---|
| Add a Unit | Locate the cursor on the first position of an empty Unit field. Enter the name of the unit. Change the Select Type and Knob Setting, if desired. Press INSERT. |
| Remove a Unit | Locate the cursor on the name of the unit you want to remove. Press SELECT and then press REMOVE. |
| Identify a Unit as Critical | Locate the cursor on the non-critical Unit name, press F12 (CRITICAL) and then press F11 (MODCRIT). Unit remains selected and changes to non-critical. Unit must be in P (Pending) status. |
| Change a Critical Unit to Non-Critical | Locate the cursor on the selected critical Unit name and press F12 (CRITICAL). Unit must be in P (Pending) status. |
| Monitor the Units | Press F17 (STATUS). Displays the status of each unit. A (Unit has been regrouped), P (Unit is pending, not regrouped yet), or C (Unit is in cancelled state). |

Options for Selected Source Group, Mode: Build

| | |
|---|---|
| Monitor the Units | Press F17 (STATUS). Displays the status of each unit. A (Unit has been regrouped), P (Unit is pending, not regrouped yet), or C (Unit is in cancelled state). |

| If You Want To: | Then: |
|---|---|
| Select/Unselect All Units on the Page | Press F14 (SELALL). |
| Select a Unit | Locate the cursor on the unselected Unit name you want to select and press SELECT. |
| Unselect a Selected Unit | Locate the cursor on the selected Unit name you want to unselect and press SELECT. |
| Identify a Unit as Critical | Locate the cursor on the non-critical Unit name and press F12 (CRITICAL). If unit is unselected, F12 also selects it. |
| Change a Critical Unit to Non-Critical | Locate the cursor on the selected critical Unit name and press F12 (CRITICAL). Unit remains selected and changes to non-critical. |

| | |
|---|---|
| Change the Select Type of a Unit | Unit field headings must read Unit-T. If not, press F18 (KNOB/SEL) to change. Locate cursor on T field of desired unit and overwrite T field (0-2). |
| Change the Knob Setting of a Unit | Unit field headings must read Unit-K. If not, press F18 (KNOB/SEL) to change. Locate cursor on K field of desired unit and overwrite K field (1-8). |
| Add a Unit** | Locate the cursor on the first position of an empty Unit field. Enter the name of the unit. Change the Select Type and Knob Setting, if desired. |
| Purge All Unselected Units | Press F19 (Purge). Deletes the unselected units and rearranges the selected units alphabetically. |

*Press F10 for new page, if desired.
**Unit must be a valid unit in the System Manager Database.

---
NOTE
PRESS F7 (SAVE) WHEN ALL SELECTIONS AND CHANGES ON A PAGE ARE MADE. AFTER ALL PAGES ARE COMPLETED PRESS F6 (EXIT).

---

REQUIRED FIELDS

| | |
|---|---|
| Unit | Heading for the unit fields directly below. The unit fields will either display valid Unit names, blank unit fields or a combination of both. Blank unit fields provide space to add Unit names. |
| T | T, Select Type of the Unit (0-2).<br><br>0 = Forced Select, No Deselect<br>1 = Default. Forced Select, Optional Deselect<br>2 = No Select, Optional Select |
| K | Group Knob Setting on the unit (1-8). |

INFORMATION FIELDS

| | |
|---|---|
| Page XX of XX | Current page number and the total number of pages in the unit file. |
| Current Mode | Current mode of the Destination group- BUILD (not ACTIVE), ACTIVE, ACT STP (ACTIVE STOPPED), or REMOVE (CANCEL). |

| | |
|---|---|
| Regroup Plan | Name of the Regroup Plan (from the Directory file) the Unit record belongs to. |
| Units from Source Group | Name of the group in the System Manager database that the units are displayed from. |
| Destination Group | Name selected for the Destination group (from the Define record). |
| Group Level | Displays the Group Level (Agency, Fleet or Subfleet) of the Source group. |
| Description | Destination group description from the Define record. |
| S (Unit-S) | Status of the unit- (A for Active, P for Pending or C for Cancel). Functions only in Active and Remove Mode. |
| Percentage Required | Percent of non-critical units necessary for the regroup (from the Define record). |
| Complete | Percent of non-critical units submitted that have been activated. |
| Critical Unit Count | Number of critical units submitted. |
| Resolved | Number of critical units submitted that have been activated. |

FUNCTION KEYS

| | |
|---|---|
| F6 EXIT | Returns to the Directory screen. |
| F7 SAVE | Saves the displayed screen. |
| F9 NXTGRP | NEXT GROUP. Displays the first page of units in the next Source group. |
| F10 NEWPAG | NEW PAGE. Displays a blank unit page for adding units. |
| F11 MODCRIT | MODIFY CRITICAL. ACTIVE Mode only. Sends changed Critical/Non-critical state of a unit to the scheduler. |
| F12 CRITICAL | Alternate action key. Designates a unit as Critical/Non-critical. |
| F14 SELALL | SELECT ALL. Selects/Unselects all units on the displayed page. |
| F17 STATUS | Unit-S. Displays the status of each unit as A (ACTIVE), P (PENDING) or C (CANCEL). Does not operate in BUILD Mode. |

| | |
|---|---|
| F18 KNOB/SEL | KNOB/SELECT. Alternates between Unit K, Group Knob Setting (1-8) and Unit T, Select Type (0-2). |
| F19 PURGE | Removes all the units not selected in the Source group. Lists selected units alphabetically in the Destination group. |
| F20 MORE | Displays additional function keys. |
| SELECT | Selects/Unselects a unit. Cursor must be within the desired unit field. Does not operate in REMOVE Mode. |
| INSERT | Allows additional units to be added during ACTIVE Mode. Adds units after restart in ACT STP Mode. Does not operate in BUILD or REMOVE Mode. |
| REMOVE | Allows units to be removed during ACTIVE Mode. Allows units to be selected for removal in ACT STP mode and removes them _after_ restart. Does not operate in BUILD or REMOVE Mode. |
| NEXT SCREEN | Displays the next page in the unit file or a message if the last page is currently displayed. |
| PREV SCREEN | PREVIOUS SCREEN. Displays the previous page in the unit file or a message if the first page is currently displayed. |

MESSAGES

Critical Unit Collision Encountered; Regroup Not Submitted -- Regroup has designated two or more units as critical under the same unit group knob setting. Regroup Activation request aborted.

One or More Non-Critical Units Not Submitted -- Not submitted due to non-critical unit collision or insufficient regroup buffer space at the site.

Please Enter Units To Be Regrouped -- Regroup Activation request submitted with no units supplied.

Regroup Active -- Regroup Activation request submitted on ACTIVE regroup.

Regroup Inactive -- Request submitted requires regroup to be ACTIVE, regroup found to be INACTIVE.

Regroup Inconsistent With Request; Request Denied -- Current state of regroup will not allow request.

Regroup Record Not Found -- Regroup request submitted for undefined regroup.

Unable To Allocate Group Record; Regroup Not Submitted -- Cannot find Group ID record available for dynamic regroup within designed Group ID pool of the specified regroup.

Unable To Insert All Units; Regroup Not Submitted -- Insufficient regroup buffer space at site for total number of critical units submitted or no regroup buffer space at all.

What is Claimed is:

1. A method of dynamically regrouping radio transceivers in a trunked radio communications system comprising:
   establishing at least one alternate control channel in addition to a main control channel and transmitting regrouping control messages over said alternate control channel; and
   subsequently transmitting regrouping control messages on said main control channel directed to individual radio transceivers to be regrouped which fail to receive said regrouping control messages transmitted over said alternate control channel.

2. A method of dynamically regrouping radio transceivers in a trunked radio communications system of the type having a digital control channel, said method comprising:
   temporarily establishing at least one digital control channel for communicating regrouping control messages simultaneously to a number of transceivers in excess of a predetermined number; and
   if the number of transceivers to be regrouped is less than said predetermined number, instead communicating said regrouping control messages over said first-mentioned control channel.

3. A method of dynamically regrouping radio transceivers in a trunked radio communications system of the type having digital control channel, said method comprising:
   temporarily establishing and maintaining a first alternate control channel for communication of regrouping control messages to a first group of transceivers; and
   substantially simultaneously temporarily establishing and maintaining a further alternate control channel for communication of regrouping control messages to a further group of transceivers.

4. A method of dynamically regrouping RF transceivers in a trunked radio repeater system including the steps of:
   (1) transmitting a dynamic regroup control message over a digital RF control channel, said regroup message identifying an existing transceiver group;
   (2) temporarily establishing an alternate digital RF control channel;
   (3) in response to said regroup control message, retuning said existing transceiver group to said alternate control channel; and
   (4) communicating further dynamic regroup control messages to said transceiver group over said alternate control channel.

5. A method as in claim 4 wherein said communicating step (4) includes:
   transmitting further dynamic regroup control messages over said alternate control channel directed to individual transceivers in said group; and
   transmitting acknowledgement messages from said individual transceivers over said alternate control channel in response to said further dynamic regroup control messages.

6. A method as in claim 4 wherein said communicating step (4) comprises transmitting said further dynamic regroup control messages to only some but not all of the transceivers in said group over said alternate control channel.

7. A method of dynamically regrouping RF transceivers in a trunked radio repeater system including at least one group of RF transceivers, including the steps of:
   (1) selecting a subset of said group of RF transceivers;
   (2) transmitting a dynamic regroup control message over a digital RF control channel, said regroup message identifying said transceivers group;
   (3) temporarily establishing an alternate digital RF control channel;
   (4) in response to said regroup control message, monitoring said alternate control channel with the transceiver group;
   (5) transmitting at least one further dynamic regroup control message directed to said selected subset of RF transceivers over said alternate control channel;
   (6) transmitting acknowledgement messages from said selected RF transceiver subset over said alternate control channel in response to said further dynamic regroup control message;
   (7) receiving said transmitted acknowledgement messages;
   (8) comparing the transceivers selected by said selecting step (1) with the transceivers transmitting acknowledgement messages in said transmitting step (6) in response to said received acknowledgement messages;
   (9) conditioning the transmission of a dynamic regroup activation message over said first-mentioned control channel on the results of said comparing step (8);
   (10) subsequent to said monitoring step (4), monitoring said first-mentioned control channel with said transceiver group; and
   (11) monitoring a further communications channel with said subset of transceivers in response to transmission of said dynamic regroup activation message.

8. A method of dynamically regrouping radio transceivers in a trunked radio communications system comprising:
   (1) selecting at least one predefined RF transceiver source group;
   (2) displaying a listing of the transceivers within said selected source group;

(3) selecting a subset of said listed transceivers;

(4) transmitting a first dynamic regroup message directed to all of said transceivers within said source group (5) monitoring an alternate control channel with said transceivers within said source group in response to said first dynamic regroup message; and (5) transmitting a further dynamic regroup message over said alternate control channel only to said selected subset of transceivers.

9. A method of dynamically regrouping radio transceivers in a trunked radio communications system comprising:

(1) selecting a dynamic regroup plan;

(2) displaying a listing of source groups and a further listing of destination groups associated with said selected plan;

(3) selecting a listed source group and a listed destination group;

(4) displaying a listing of RF transceivers included within said selected source group;

(5) selecting RF transceivers from said display listing; and (6) dynamically regrouping said selected transceivers into said selected destination group.

10. A method of dynamically regrouping radio transceivers in a trunked radio communications system comprising:

receiving a dynamic regroup control message over a first digital RF control channel;

monitoring an alternate digital RF control channel in response to receipt of said dynamic regroup control message;

receiving a further dynamic regroup control message over said alternate control channel, said further message specifying a regroup plan and a regroup identification;

transmitting an acknowledgement message over said alternate control channel in response to receipt of said further message;

again monitoring said first control channel and receiving a dynamic regroup activate message over said first control channel, said activate message specifying said regroup plan;

activating said regroup identification in response to said activate message; and subsequent to said activating step, reacting to call messages transmitted over said first control channel specifying said regroup identification.

11. A method of dynamically regrouping radio transceivers in a trunked radio communications system comprising:

(a) transmitting a dynamic regroup message to a plurality of radio transceivers, said message specifying a regroup identification;

(b) storing said regroup identification within said plurality of radio transceivers but inhibiting said transceivers from sending or receiving calls using said stored regroup identification;

(c) transmitting a further bit map message specifying activation of said stored regroup identification; and (d) enabling said transceivers to send and receive calls using said stored regroup identification only in response to receipt of said further bit map message.

12. A method of dynamic regrouping in a trunked radio communications systems comprising the steps of:

(a) receiving a dynamic regroup message specifying a regroup identification;

(b) storing said regroup identification within a non-volatile memory device;

(c) initially inhibiting sending or receiving calls using said stored regroup identification; (c) receiving a further bit map message specifying activation of said stored regroup identification; and (d) enabling sending and receiving of calls using said stored regroup identification only in response to receipt of said further bit map message.

13. A method of deactivating a dynamic regrouping in a trunked radio communications system comprising:

(a) transmitting a call message specifying a regroup to a plurality of dynamically regrouped radio transceivers;

(b) monitoring an alternate control channel in response to said call message;

(c) transmitting cancel regroup messages individually to each of said plurality of transceivers over said alternate control channel;

(d) canceling said dynamic regrouping individually at each of said plurality of transceivers in response to said cancel regroup messages; and (e) alternatively, canceling said dynamic regrouping message at each of said plurality of transceivers in response to a bit map message transmitted over a main control channel different from said alternate control channel.

14. A trunked radio communications system including dynamic regrouping capability comprising;

means for establishing an alternate control channel in addition to a main control channel and transmitting regrouping control messages over said alternate control channel; and means for subsequently transmitting regrouping control messages on said main control channel directed to individual radio transceivers to be regrouped which fail to receive said regrouping control messages transmitted over said alternate control channel.

15. Apparatus for dynamically regrouping radio transceivers in a trunked radio communications system of the type having a digital control channel, said apparatus comprising:

means for temporarily establishing a further digital control channel for communicating regrouping control messages simultaneously to a number of transceivers in excess of a predetermined number; and means for determining if the number of transceivers to be regrouped is less than said predetermined number and for instead communicating said regrouping control messages over said first-mentioned control channel in response to such determination.

16. Apparatus for dynamically regrouping radio transceivers in a trunked radio communications system of the type having digital control channel comprising:

means for temporarily establishing and maintaining a first alternate control channel for communication of regrouping control messages to a first group of transceivers; and means for substantially simultaneously temporarily establishing and maintaining a further alternate control channel for communication of regrouping control messages to a further group of transceivers.

17. A trunked radio repeater system including:

means for transmitting a dynamic regroup control message over a digital RF control channel, said regroup message identifying an existing transceiver group;

means for temporarily establishing an alternate digital RF control channel;

means for returning said existing transceiver group to said alternate control channel in response to said regroup control message; and means connected to said establishing means for communicating further dynamic regroup control messages to said transceiver group over said alternate control channel.

18. A method as in claim 17 wherein said communicating means includes:

means for transmitting further dynamic regroup control messages over said alternate control channel directed to individual transceivers in said group; and means for transmitting acknowledgement messages from said individual transceivers over said alternate control channel in response to said further dynamic regroup control messages.

19. A system as in claim 17 wherein said communicating means comprises means for transmitting said further dynamic regroup control messages to only some but not all of the transceivers in said group over said alternate control channel.

20. A system for dynamically regrouping RF transceivers in a trunked radio communications arrangement including at least one group of RF transceivers, including:

means for selecting a subset of said group of RF transceivers;

means for transmitting a dynamic regroup control message over a digital RF control channel, said regroup message identifying said transceiver group;

means for temporarily establishing an alternate digital RF control channel;

means responsive to said regroup control message for monitoring said alternate control channel with the transceiver group;

means for transmitting at least one further dynamic regroup control message directed to said selected subset of RF transceivers over said alternate control channel;

means for transmitting acknowledgement messages from said selected RF transceiver subset over said alternate control channel in response to said further dynamic regroup control message;

means for receiving said transmitted acknowledgement messages;

means for comparing the transceivers selected by said selecting means with the transceivers transmitting acknowledgement messages to said receiving means in response to said received acknowledgement messages;

means for transmitting a dynamic regroup activation message over said first-mentioned control channel and for conditioning said transmission on the results of said comparing means, wherein each of said transceivers in said group includes means for monitoring said first-mentioned control channel, and said subset of transceivers includes means for monitoring a further communications channel in response to transmission of said dynamic regroup activation message.

21. An arrangement for dynamically regrouping radio transceivers in a trunked radio communications system comprising:

means for selecting at least one predefined RF transceiver source group;

means for displaying a listing of the transceivers within said selected source group;

means for selecting a subset of said listed transceivers;

means for transmitting a first dynamic regroup message directed to all of said transceivers within said source group means for monitoring an alternate control channel with said transceivers within said source group in response to said first dynamic regroup message; and means for transmitting a further dynamic regroup message over said alternate control channel only to said selected subset of transceivers.

22. Equipment for dynamically regrouping radio transceivers in a trunked radio communications system comprising:

means for selecting a dynamic regroup plan;

means for displaying a listing of source groups and a further listing of destination groups associated with said selected plan;

means for selecting a listed source group and a listed destination group;

means for displaying a listing of RF transceivers included within said selected source group;

means for selecting RF transceivers from said displayed listing; and means for initiating dynamically regrouping of said selected transceivers into said selected destination group.

23. A radio transceiver of the type that operates in a trunked radio communications system, said transceiver comprising:

means for receiving a dynamic regroup control message over a first digital RF control channel and for monitoring an alternate digital RF control channel in response to receipt of said special group message;

said receiving means also for receiving a further dynamic regroup control message over said alternate control channel, said further message specifying a regroup plan and a regroup identification;

means connected to said receiving means for transmitting an acknowledgement message over said alternate control channel in response to receipt of said further message;

said receiving means also for monitoring said first control channel and receiving a dynamic regroup activate message over said first control channel, said activate message specifying said regroup plan;

means for activating said regroup identification in response to said activate message; and means for reacting to call messages transmitted over said first control channel specifying said regroup identification.

24. A digital mobile radio communications system comprising;

transmitting means for transmitting a dynamic regroup message to a plurality of radio transceivers, said message specifying a regroup identification;

means within each of said plurality of radio transceiver for storing said regroup identification but inhibiting said transceivers from sending or receiving calls using said stored regroup identification;
further transmitting means for transmitting a further bit map message specifying activation of said stored regroup identification; and
means within each of said transceivers for enabling said transceivers to send and receive calls using said stored regroup identification only in response to receipt of said further bit map message.

25. A digital mobile radio transceiver comprising;
means for receiving a dynamic regroup message specifying a regroup identification;
non-volatile memory means connected to said receiving means for storing said received regroup identification;
radio frequency transmitting means connected to said non-volatile memory means for sending signals associated with groups having identifications stored in said non-volatile memory means; and
said receiving means for receiving a further bit map message specifying activation of said stored regroup identification; and
control means connected to said non-volatile memory means and to said transmitting means for initially inhibiting sending calls using said stored regroup identification and for enabling sending of calls using said stored regroup identification only in response to receipt of said further bit map message.

26. A trunked radio communications system comprising:
means for transmitting a call message specifying a regroup to a plurality of dynamically regrouped radio transceivers;
means for monitoring an alternate control channel in response to said call message;
means for transmitting cancel regroup messages individually to each of said plurality of transceivers over said alternate control channel;
means for canceling said dynamic regrouping individually at each of said plurality of transceivers in response to said cancel regroup messages; and
alternatively canceling means for canceling said dynamic regrouping message at each of said plurality of transceivers in response to a bit map message transmitted over a main control channel different from said alternate control channel.

27. A method of dynamically regrouping digital radio transceivers comprising the steps of:
(a) selecting a predefined source group comprising plural mobile radio transceivers from a plurality of such source groups;
(b) defining a destination group comprising selected ones of said plural transceivers of said source group;
(c) repeating said steps (a) and (b) so as to define a plurality of destination groups within a single dynamic regroup plan; and
(d) simultaneously automatically dynamically regrouping one of: (i) substantially all of said mobile transceivers defined within said plan, or (ii) substantially all of said mobile transceivers defined within a destination group defined by said step (b).

28. A method as in claim 27 wherein said regrouping step (d) comprises the steps of:
d1) selecting said plan;
(d2) transmitting a group call message to each of said selected source groups; and
(d3) transmitting a dynamic regroup message to each of said selected transceivers within each of said destination groups.

29. A method as in claim 27 wherein said regrouping step (d) comprises:
(d1) selecting one of said destination groups defined by said step (b);
(d2) transmitting a group call message to each of said source groups selected by said selecting step (a) in defining said one destination group; and
(d3) transmitting a dynamic regroup message to each of said selected transceivers within said one selected destination group.

30. The method of claim 11 wherein said method further includes the steps of:
transmitting a dynamic regroup acknowledgement message in response to said dynamic regroup message transmitted by said transmitting step (a), and
conditioning performance of said transmitting step (c) on receipt of said acknowledgement message from at least one of certain predefined critical ones of said plurality of radio transceivers, and a certain percentage of said plurality of radio transceivers.

* * * * *